US012328778B2

(12) United States Patent
Liu et al.

(10) Patent No.: US 12,328,778 B2
(45) Date of Patent: Jun. 10, 2025

(54) NEAR FIELD COMMUNICATION-BASED COMMUNICATION METHOD, APPARATUS, AND SYSTEM

(71) Applicant: Huawei Technologies Co., Ltd., Shenzhen (CN)

(72) Inventors: Zhaoshen Liu, Dongguan (CN); ChiaHao Chen, Shenzhen (CN); Yichuan Zhang, Dongguan (CN); Yong Xiong, Dongguan (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 378 days.

(21) Appl. No.: 17/802,867

(22) PCT Filed: Feb. 5, 2021

(86) PCT No.: PCT/CN2021/075539
§ 371 (c)(1),
(2) Date: Aug. 26, 2022

(87) PCT Pub. No.: WO2021/169774
PCT Pub. Date: Sep. 2, 2021

(65) Prior Publication Data
US 2023/0156835 A1 May 18, 2023

(30) Foreign Application Priority Data
Feb. 29, 2020 (CN) .......................... 202010132975.5

(51) Int. Cl.
*H04W 76/14* (2018.01)
*G06K 7/10* (2006.01)

(52) U.S. Cl.
CPC ........ *H04W 76/14* (2018.02); *G06K 7/10297* (2013.01)

(58) Field of Classification Search
CPC .......................... H04W 76/14; G06K 7/10297
USPC ........................................................ 455/41.2
See application file for complete search history.

(56) References Cited

U.S. PATENT DOCUMENTS

| 2015/0317024 | A1* | 12/2015 | Wang et al. ............ H04W 4/40 455/41.2 |
| 2016/0028445 | A1 | 1/2016 | Mofidi et al. |
| 2018/0115948 | A1 | 4/2018 | Choi et al. |
| 2018/0123645 | A1* | 5/2018 | Jang ........................ G06F 21/44 |
| 2018/0295513 | A1 | 10/2018 | Embree et al. |
| 2018/0310157 | A1* | 10/2018 | Pan ....................... H04W 76/16 |

(Continued)

FOREIGN PATENT DOCUMENTS

| CN | 103095342 A | 5/2013 |
| CN | 105809231 A * | 7/2016 |

(Continued)

*Primary Examiner* — Mong-Thuy T Tran
(74) *Attorney, Agent, or Firm* — Slater Matsil, LLP

(57) ABSTRACT

Embodiments of this application disclose an NFC-based communication method, an apparatus, and a system. In the NFC-based communication method, an electronic device works in an NFC reader/writer mode and performs an NFC communication process with an NFC tag. When failing to perform the NFC communication process, the electronic device may adjust a currently used radio frequency parameter, and re-perform the NFC communication process with the NFC tag by using an adjusted radio frequency parameter.

18 Claims, 9 Drawing Sheets

(56) References Cited

U.S. PATENT DOCUMENTS

| | | |
|---|---|---|
| 2019/0191477 A1 | 6/2019 | Jang |
| 2019/0205863 A1* | 7/2019 | Shin ..................... G06Q 20/386 |
| 2020/0169297 A1* | 5/2020 | Kim ................... G06K 19/0723 |
| 2020/0242310 A1* | 7/2020 | Kou ................... G06K 7/10237 |
| 2021/0167815 A1* | 6/2021 | Roh ........................ H04B 5/72 |
| 2022/0038899 A1* | 2/2022 | Yang ........................ H04L 9/08 |
| 2022/0191956 A1* | 6/2022 | Manthrayil Sachidanandan ......... H04W 4/80 |

FOREIGN PATENT DOCUMENTS

| | | | |
|---|---|---|---|
| CN | 105825158 A | | 8/2016 |
| CN | 107995607 A | | 5/2018 |
| CN | 108205637 A | | 6/2018 |
| CN | 109936838 A | | 6/2019 |
| CN | 112395894 A | | 2/2021 |
| TW | 101218960 U | * | 4/2013 |
| WO | WO-2018133178 A1 | * | 7/2018 ............. G06Q 20/32 |

* cited by examiner

NEAR FIELD COMMUNICATION-BASED COMMUNICATION METHOD, APPARATUS, AND SYSTEM

CROSS-REFERENCE TO RELATED APPLICATIONS

This application is a national stage of International Application No. PCT/CN2021/075539, filed on Feb. 5, 2021, which claims priority to Chinese Patent Application No. 202010132975.5, filed on Feb. 29, 2020. Both of the aforementioned applications are hereby incorporated by reference in their entireties.

TECHNICAL FIELD

This application relates to near field communication (near field communication, NFC) technologies, and in particular, to an NFC-based communication method, an apparatus, and a system.

BACKGROUND

With development of electronic technologies, increasingly more electronic devices (such as a smartphone and a smart band) support an NFC technology. The NFC technology is used to provide a short-distance high-frequency wireless connection, to implement bidirectional communication between electronic devices. An electronic device that supports the NFC technology may work in the following three communication modes: a reader/writer mode (reader/writer mode), a card emulation mode (card emulation mode), and a peer-to-peer mode (P2P mode).

When working in the reader/writer mode, the electronic device may read data stored in an NFC tag (tag). Currently, when the electronic device communicates with the NFC tag, performance of a radio frequency signal between the electronic device and the NFC tag may be unstable, and consequently the electronic device fails to read data. How to ensure stability of the radio frequency signal between the electronic device and the NFC tag, to ensure that the electronic device successfully reads data from the NFC tag and improve user experience is a current research direction in the industry.

SUMMARY

Embodiments of this application provide an NFC-based communication method, an apparatus, and a system, so that stability of a radio frequency signal between an electronic device and an NFC tag can be adjusted by adjusting a radio frequency parameter, to improve a success rate of reading data from the NFC tag.

According to a first aspect, an embodiment of this application provides an NFC-based communication method that is applied to an electronic device. The method may include: The electronic device supports NFC and works in an NFC reader/writer mode. The electronic device performs an NFC communication process between the electronic device and an NFC tag by using a first radio frequency parameter. The electronic device performs the NFC communication process again by using a second radio frequency parameter when a preset condition is met, where the second radio frequency parameter is different from the first radio frequency parameter; and the first parameter and the second radio frequency parameter each include one or more of the following: transmit power of sending a radio frequency signal by the electronic device, sensitivity of receiving a radio frequency signal by the electronic device, a modulation mode used during load modulation, a waveform of a carrier, an amplitude of the carrier, a phase of the carrier, or a frequency of the carrier.

According to the method provided in the first aspect, when failing to read data from the NFC tag, the electronic device may adjust a currently used radio frequency parameter, and re-perform the NFC communication process with the NFC tag by using an adjusted radio frequency parameter. In this way, stability of a radio frequency signal between the electronic device and the NFC tag can be adjusted by adjusting the radio frequency parameter, to improve a success rate of reading the data from the NFC tag, and improve user experience.

With reference to the first aspect, in some embodiments, the following four preset conditions may be included.

1. The electronic device does not receive a complete unique identifier UID of the NFC tag within a time period T1 after the NFC tag is detected.

In some embodiments, when the first preset condition is met, the electronic device may perform the NFC communication process with the NFC tag from the beginning by using the second radio frequency parameter, that is, the electronic device may generate a radio frequency field by using the second radio frequency parameter and detect the NFC tag, perform anti-collision processing and receive the complete UID of the NFC tag, and then receive an index and read data based on the index. In some other embodiments, when the first preset condition is met, the electronic device may perform anti-collision processing again by using the second radio frequency parameter and receive the complete UID of the NFC tag, and then receive an index and read data based on the index, and does not need to re-generate a radio frequency field and detect the NFC tag. This can improve efficiency of reading the data from the NFC tag by the electronic device.

In some embodiments, when the first preset condition is met, a difference between the second radio frequency parameter and the first radio frequency parameter exceeds a preset range. To be specific, the electronic device may adjust a large quantity of parameter items in the first radio frequency parameter and/or adjust the first radio frequency parameter at a large amplitude, to obtain the second radio frequency parameter, and perform the NFC communication process with the NFC tag again by using the second radio frequency parameter. Adjusting a large quantity of parameter items in the radio frequency parameter and/or adjusting the radio frequency parameter at a large amplitude enables the electronic device to quickly and successfully establish an NFC radio frequency connection to the NFC tag by using the second radio frequency parameter, so that efficiency of reading the data from the NFC tag is improved.

2. A quantity of times of generating a radio frequency lost message by the electronic device is greater than a first value. Specifically, when an NFC radio frequency connection between the electronic device and the NFC tag is unstable or broken, the NFC chip of the electronic device generates the RF lost and reports the RF lost to a processor.

3. The electronic device does not receive a reply from the NFC tag to a first message within a time period T2 after the electronic device sends the first message to the NFC tag, where the first message may be any message sent by the electronic device in performing the NFC communication process with the NFC tag.

4. Data read by the electronic device from the NFC tag is incomplete or inaccurate. Herein, the electronic device may determine, according to a data encapsulation specification agreed on with the NFC tag, whether the received data is complete or accurate.

In some embodiments, when any one of the preset conditions 2 to 4 is met, the electronic device may perform the NFC communication process with the NFC tag from the beginning by using the second radio frequency parameter, that is, the electronic device may generate a radio frequency field by using the second radio frequency parameter and detect the NFC tag, perform anti-collision processing and receive the complete UID of the NFC tag, and then receive an index and read data based on the index.

In some embodiments, when any one of the preset conditions 2 to 4 is met, a difference between the second radio frequency parameter and the first radio frequency parameter is within a preset range. To be specific, the electronic device may adjust a small quantity of parameter items in the first radio frequency parameter and/or adjust the first radio frequency parameter at a small amplitude, to obtain the second radio frequency parameter, and perform the NFC communication process with the NFC tag again by using the second radio frequency parameter. In this case, because the electronic device has established a stable NFC communication connection to the NFC tag, slightly adjusting the radio frequency parameter enables the electronic device to successfully read the data from the NFC tag, so that power consumption of the electronic device can be reduced.

With reference to the first aspect, in some embodiments of this application, the electronic device may pre-store specific adjustment policies of the radio frequency parameter that respectively correspond to the foregoing four preset conditions. The adjustment policy may specifically include a radio frequency parameter item adjusted by the electronic device, and an adjustment amplitude or a manner of each radio frequency parameter item that needs to be adjusted. When determining, in a manner, that the NFC communication process fails to be performed, the electronic device adjusts the radio frequency parameter by using an adjustment policy corresponding to the manner, to obtain the second radio frequency parameter.

With reference to the first aspect, in some embodiments, if the electronic device successfully performs the NFC communication process by using the second radio frequency parameter, that is, the electronic device successfully reads the data from the NFC tag, the electronic device may perform a corresponding operation based on the data read from the NFC tag, where the operation may include any one of the following: establishing a connection to a first device and transmitting audio and video data to the first device, accessing a website, downloading a file, or storing the data.

With reference to the first aspect, in some embodiments, if the electronic device successfully performs the NFC communication process by using the second radio frequency parameter, that is, the electronic device successfully reads the data from the NFC tag, the electronic device may store the UID of the NFC tag and the second radio frequency parameter in association, or may write the second radio frequency parameter to the NFC tag, or may store the second radio frequency parameter in a cloud server. In this way, it can be ensured that the second radio frequency parameter can be obtained in each NFC communication process subsequently performed between the electronic device and the NFC tag, and the data can be read from the NFC tag at a high success rate.

With reference to the first aspect, in some embodiments, if a quantity of times of failing to perform the NFC communication process by the electronic device exceeds a second value, the electronic device may search for a radio frequency parameter that is stored in association with the UID of the NFC tag, and perform the NFC communication process again by using the radio frequency parameter that is stored in association with the UID of the NFC tag. Herein, the electronic device may find, locally, in the NFC tag, or in a remote server, the radio frequency parameter that is stored in association with the UID of the NFC tag.

With reference to the first aspect, in some embodiments, the electronic device may display a first user interface when the preset condition is met, where the first user interface includes a first control; and detect a user operation performed on the first control. In response to the user operation performed on the first control, the electronic device may perform the NFC communication process again by using the second radio frequency parameter. In some other embodiments, when detecting that the electronic device approaches the NFC tag, the electronic device may perform the NFC communication process again by using the second radio frequency parameter. In such a manner of triggering, by performing the user operation, the electronic device to perform the NFC communication process with the NFC tag by using the second radio frequency parameter, a user may independently determine whether to adjust the radio frequency parameter, to provide the user with more selections.

According to a second aspect, an embodiment of this application provides an electronic device. The electronic device includes a memory, an NFC chip, and one or more processors. The memory is coupled to the one or more processors. The memory is configured to store computer program code. The computer program code includes computer instructions. The one or more processors invoke the computer instructions to enable the electronic device to perform the following operations: working in an NFC reader/writer mode, and performing an NFC communication process between the electronic device and an NFC tag by using a first radio frequency parameter; and performing the NFC communication process again by using a second radio frequency parameter when a preset condition is met, where the second radio frequency parameter is different from the first radio frequency parameter; and the first parameter and the second radio frequency parameter each include one or more of the following: transmit power of sending a radio frequency signal by the NFC chip, sensitivity of receiving a radio frequency signal by the NFC chip, a modulation mode used during load modulation, a waveform of a carrier, an amplitude of the carrier, a phase of the carrier, or a frequency of the carrier.

Based on a same inventive concept, the electronic device in the second aspect may be configured to perform the NFC-based communication method according to any one of the first aspect or the implementations of the first aspect. Therefore, for an operation performed by the electronic device in the second aspect and beneficial effects brought by the electronic device, refer to related descriptions in any one of the first aspect or the possible implementations of the first aspect. Details are not described herein again.

According to a third aspect, an embodiment of this application provides an NFC chip, and the NFC chip is applied to an electronic device. The NFC chip includes one or more processors and an interface. The interface is configured to: receive code instructions and transmit the code instructions to the processor. The processor is configured to run the code instructions to enable the electronic device to perform the method according to any one of the first aspect or the possible implementations of the first aspect.

According to a fourth aspect, an embodiment of this application provides a system. The system includes an electronic device and a first device. The electronic device supports NFC, and the first device includes an NFC tag. The NFC tag stores data used to establish a communication connection between the electronic device and the first device. The electronic device may be the electronic device in the second aspect, and is configured to perform the method according to any one of the first aspect or the possible implementations of the first aspect. The first device is configured to: establish a communication connection to the electronic device, and receive, through the communication connection, multimedia data sent by the electronic device.

With reference to the fourth aspect, in some embodiments, the first device is further configured to play multimedia based on the received multimedia data, to implement an application such as projection.

According to a fifth aspect, an embodiment of this application provides a computer storage medium, including computer instructions. When the computer instructions are run on an electronic device, a communications apparatus is enabled to perform the method according to any one of the possible implementations of any one of the foregoing aspects.

According to a sixth aspect, an embodiment of this application provides a computer program product. When the computer program product runs on a computer, the computer is enabled to perform the method according to any one of the possible implementations of any one of the foregoing aspects.

According to the technical solutions provided in embodiments of this application, the electronic device works in the NFC reader/writer mode and performs the NFC communication process with the NFC tag. When failing to perform the NFC communication process, the electronic device may adjust a currently used radio frequency parameter, and re-perform the NFC communication process with the NFC tag by using an adjusted radio frequency parameter. In this way, stability of a radio frequency signal between the electronic device and the NFC tag can be adjusted by adjusting the radio frequency parameter, to improve a success rate of reading the data from the NFC tag, and improve user experience.

DETAILED DESCRIPTION OF ILLUSTRATIVE EMBODIMENTS

The following clearly describes technical solutions in embodiments of this application in detail with reference to the accompanying drawings. In descriptions of embodiments of this application, "/" indicates "or" unless otherwise stated. For example, A/B may indicate A or B. The term "and/or" in this specification merely describes an association relationship for describing associated objects, and indicates that three relationships may exist. For example, A and/or B may indicate the following three cases: Only A exists, both A and B exist, and only B exists. In addition, in the descriptions of embodiments of this application, "a plurality of" means two or more.

The following terms "first" and "second" are merely intended for description, and shall not be understood as an indication or implication of relative importance or implicit indication of a quantity of indicated technical features. Therefore, a feature limited by "first" or "second" may explicitly or implicitly include one or more features. In the descriptions of embodiments of this application, unless otherwise specified, "a plurality of" means two or more.

When working in an NFC reader/writer mode (reader/writer mode), an electronic device may read/write data from/to an NFC tag (tag). The NFC tag is a small apparatus including an NFC chip, and may be implemented in a form of a sticker, a business card, a poster, or the like. The NFC tag may be built in or attached to another device. The following describes in detail structures of an electronic device and an NFC tag that are provided in embodiments of this application. Details are not described herein.

Figure 1:
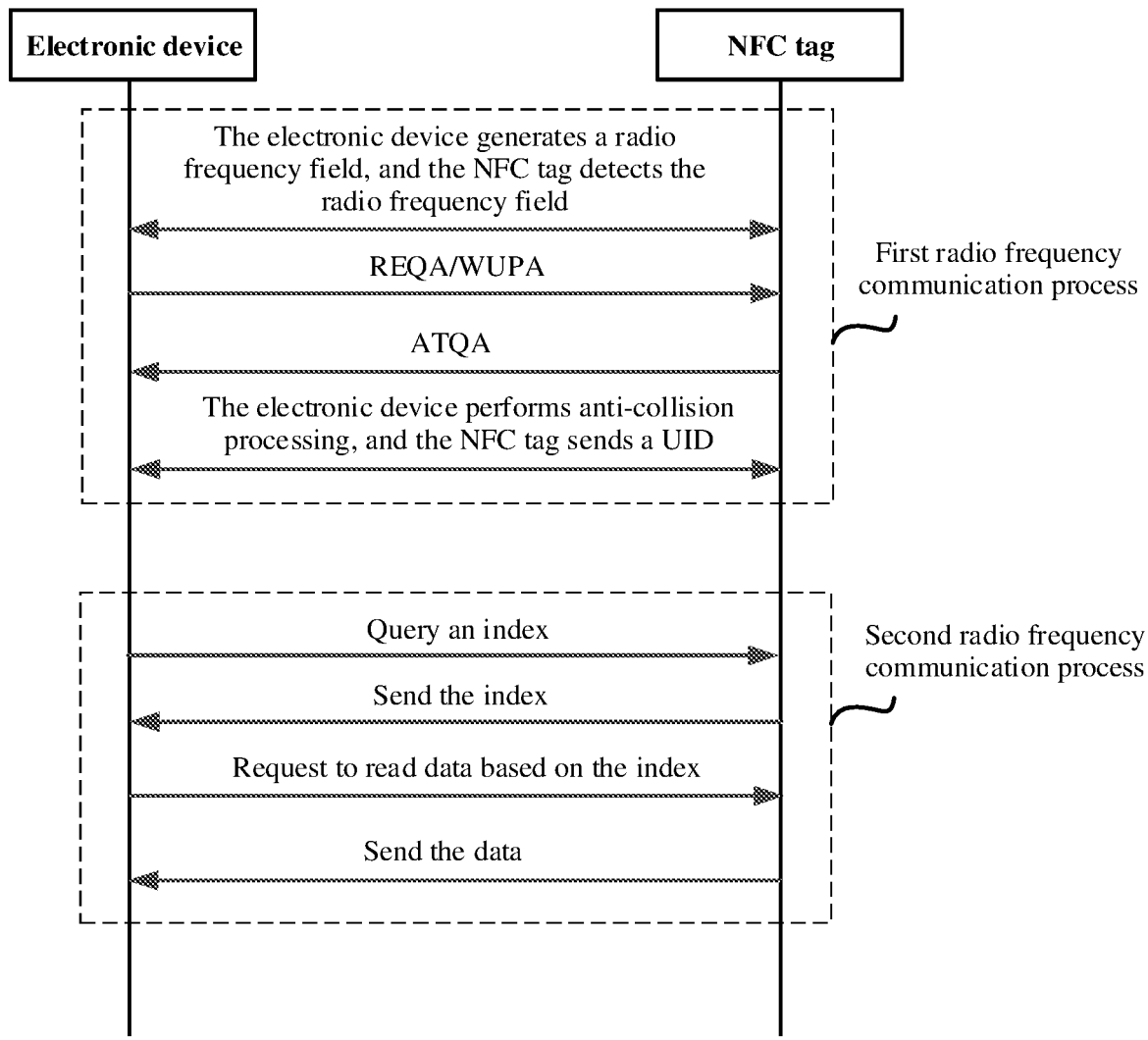
FIG. 1 is a schematic flowchart of an NFC communication process between an electronic device and an NFC tag according to an embodiment of this application.

FIG. 1 shows an NFC communication process performed between an electronic device and an NFC tag when the electronic device works in an NFC reader/writer mode and reads data from the NFC tag. An instruction, data, and the like that are transmitted between the electronic device and the NFC tag in the NFC communication process are carried in a radio frequency signal. Data stored in the NFC tag may include but is not limited to a text, a website address, a picture, a telephone number, a uniform resource identifier (Uniform Resource Identifier, URI), a device identifier, a device address, or another type of data.

As shown in FIG. 1, the NFC communication process performed between the electronic device and the NFC tag may include the following:

(1) First radio frequency communication process: The first radio frequency communication process is a process in which an NFC radio frequency connection is established between the electronic device and the NFC tag.

First, the electronic device may uninterruptedly or periodically send a radio frequency signal whose frequency is 13.56 megahertz (MHz), to generate an electromagnetic field transmitted through space. The electromagnetic field is a radio frequency field provided by the electronic device. An oscillator circuit of an antenna in the NFC tag within coverage of the radio frequency field oscillates under the impact of the radio frequency field, to form voltage. The NFC tag determines, based on the voltage, that the radio frequency field is detected.

Then, a radio frequency signal is sent/received between the electronic device and the NFC tag by using the radio frequency field, and the electronic device may select an NFC tag from one or more NFC tags in the radio frequency field according to an instruction carried in the radio frequency signal, to perform a subsequent second radio frequency communication process. Usually, when a user holds the electronic device to approach an NFC tag, there is only one NFC tag in the radio frequency field.

Specifically, the electronic device first sends REQA (REQuest A)/WUPA (WakeUP A). REQA or WUPA indicates the NFC tag in the radio frequency field to respond to a card type of the NFC tag. There may be the following two card types herein, that is, a type A and a type B in a manner of sending a signal to the electronic device by the NFC tag. Then, all the NFC tags within the coverage of the radio frequency field send ATQA (Answer To REQuest A) to the electronic device in response to received REQA or WUPA. When a plurality of NFC tags enter the coverage of the radio frequency field, the electronic device receives ATQA replied by the plurality of NFC tags, that is, the electronic device may detect the NFC tags in the radio frequency field. Then, the electronic device performs bit (bit)-oriented anti-collision processing to select a unique NFC tag for communication. In the anti-collision processing process, the electronic device may receive a unique identifier (unity identification, UID) that is of the selected NFC tag and that is sent by the NFC tag. In embodiments of this application, each NFC tag has a UID, and different NFC tags have different UIDs. In other words, a UID may indicate a unique NFC tag.

After selecting the unique NFC tag, the electronic device may communicate with the NFC tag about content such as a communications interface, a protocol used in the subsequent second radio frequency communication process, a waveform used to carry a radio frequency signal, and a data encapsulation form. After the communication is completed, an NFC radio frequency connection is successfully established between the electronic device and the NFC tag.

(2) Second radio frequency communication process: The second radio frequency communication process is a process in which the electronic device reads data from the NFC tag through the established NFC radio frequency connection.

An internal storage structure of the NFC tag may include a plurality of sectors (sectors), one sector includes a plurality of blocks (blocks), and one block includes a plurality of bytes. For example, some mifare-type NFC tags each may include 16 sectors, each sector includes four blocks, and each block includes 16 bytes. Valid data such as a text, a picture, and a website address in the NFC tag may be stored in some or all blocks in one or more sectors, and other blocks in the NFC tag may be used to store a password or other information.

Specifically, the electronic device may send an instruction to the NFC tag through the NFC radio frequency connection, where the instruction is used to query an index of a sector that is in the NFC tag and that is used to store data. After receiving the instruction, the NFC tag sends, to the electronic device, the index of the sector that is in the NFC tag and that is used to store data. After learning of the index of the sector that is in the NFC tag and that is used to store data, the electronic device reads, based on the index, data from the sector corresponding to the NFC tag.

In the second radio frequency communication process, the electronic device may communicate with the NFC tag according to an agreed protocol and data encapsulation specification. In some embodiments, when the electronic device reads the data from the NFC tag based on the index, the NFC tag may encapsulate the data into an NDE format message (NDEF message) according to a data exchange format technical specification (data exchange format technical specification, NDEF). An NDEF message may include one or more NDEF records (NDEF records). In some other embodiments, when the electronic device reads the data from the NFC tag based on the index, the NFC tag may alternatively encapsulate the data according to another specification such as a customized specification.

In some embodiments, after reading the data from the NFC tag, the electronic device may further write the data to the NFC tag.

It may be understood that both the first radio frequency communication process and the second radio frequency communication process are simplified examples, and more or fewer interaction instructions may be included in a specific implementation. In some embodiments, for the first radio frequency communication process, refer to the NFC standard ISO/IEC 14443-3, and for the second radio frequency communication process, refer to the NFC standard ISO/IEC 14443-4. ISO/IEC 14443-3 pertains to a bottom-layer handshake protocol. When performing a related operation in the first radio frequency communication process, the electronic device can parse the ISO/IEC 14443-3 protocol by using only a configured NFC chip without intervention of a configured processor. ISO/IEC 14443-4 pertains to an upper-layer handshake protocol. When performing a related operation in the second radio frequency communication process, the electronic device needs to parse the ISO/IEC 14443-3 protocol by using both a configured NFC chip and a configured processor. Herein, the NFC chip and the processor of the electronic device may communicate with each other according to an NFC controller interface (NFC controller interface, NCI) technical specification.

Both the NFC chip and the processor mentioned above are components of the electronic device. Functions of these components are described in detail in the following embodiments. Details are not described herein.

It may be understood that, only when stability of a radio frequency signal between the electronic device and the NFC tag is good, the first radio frequency communication process and the second radio frequency communication process shown in FIG. 1 can be successfully performed between the electronic device and the NFC tag, that is, the electronic device can successfully read the data from the NFC tag. In embodiments of this application, stability of the radio frequency signal between the electronic device and the NFC tag may include continuity, strength, and the like of receiving and/or sending the radio frequency signal by the electronic device. That the electronic device successfully reads the data from the NFC tag means that the electronic device reads complete and accurate data.

Factors that affect stability of the radio frequency signal between the electronic device and the NFC tag may include but are not limited to: 1. hardware structures of the electronic device and the NFC tag, for example, a coupling manner of an antenna, a metal material, a manufacturing process, and an internal shape, and whether power is supplied by an external power supply to the NFC tag; 2. an operation performed when a user uses the electronic device to read the NFC tag, for example, if a distance between the electronic device and the NFC tag is excessively long, or a time period of contact between the electronic device and the NFC tag is excessively short, stability of the radio frequency signal is reduced; and 3. a radio frequency parameter used when the electronic device performs the first radio frequency communication process and the second radio frequency communication process. It may be understood that when the electronic device configures different radio frequency parameters, performance of receiving and sending a radio frequency signal by the electronic device is different.

In the conventional technology, when an electronic device works in a reader/writer mode, an unstable radio frequency signal usually occurs due to the foregoing several factors. As a result, the electronic device cannot successfully or accurately complete the NFC communication process shown in FIG. 1. Therefore, the electronic device cannot read complete and accurate data in an NFC tag, and cannot perform a further operation based on the data in the NFC tag, for example, projecting, accessing a website, downloading a file, or storing the data. This affects user experience.

Based on disadvantages of the conventional technology, embodiments of this application provide an NFC-based communication method, an apparatus, and a system. In the NFC-based communication method, an electronic device works in a reader/writer mode and performs an NFC communication process with an NFC tag. When failing to perform the NFC communication process, the electronic device may adjust a currently used radio frequency parameter, and re-perform the NFC communication process with the NFC tag by using an adjusted radio frequency parameter. In this way, stability of a radio frequency signal between the electronic device and the NFC tag can be adjusted by adjusting the radio frequency parameter, to improve a success rate of reading data from the NFC tag. After successfully reading the data from the NFC tag, the electronic device may perform a further operation based on the data in the NFC tag, for example, projecting, accessing a website, or downloading a picture. In this process, a user does not perceive that the electronic device fails to read the data. This can improve user experience.

For better description, the radio frequency parameter in embodiments of this application is first described. The radio frequency parameter of the electronic device may include but is not limited to transmit power of sending a radio frequency signal, sensitivity of receiving a radio frequency signal, a modulation mode used during load modulation, a waveform of a carrier, an amplitude (represented by a modulation index) of the carrier, a phase of the carrier, rise time and falling time of the waveform, a frequency of the carrier, and the like. The following briefly describes these radio frequency parameters.

When power of transmitting the radio frequency signal by the electronic device is higher, the radio frequency signal between the electronic device and the NFC tag is more stable, and power consumption of the electronic device also correspondingly increases.

Sensitivity of receiving the radio frequency signal by the electronic device may be configured by adjusting a gain (gain) of a low noise amplifier (low noise amplifier, LNA) in the electronic device. When sensitivity of receiving the radio frequency signal by the electronic device is higher, the radio frequency signal between the electronic device and the NFC tag is more stable, and power consumption of the electronic device also correspondingly increases.

The electronic device may modulate to-be-sent original information to a carrier in a modulation mode, to generate a corresponding radio frequency signal, and then send the radio frequency signal through an antenna. There may be the following four modulation modes in an input/output manner: dual-end input and dual-end output, dual-end input and single-end output, single-end input and dual-end output, and single-end input and single-end output. A waveform, an amplitude, and a phase of a carrier used to carry information affect accuracy of receiving and parsing the information by the NFC tag, that is, the carrier affects stability of the radio frequency signal.

The following describes in detail the NFC-based communication method provided in embodiments of this application.

The NFC-based communication method may be applied to any scenario in which data is read from an NFC tag. This is not limited in embodiments of this application.

For example, the method may be applied to a projection scenario. Specifically, the NFC tag may be attached to a large-screen device (for example, a television) or built in the large-screen device. Data stored in the NFC tag may include one or more of the following: an identifier of the large-screen device, a media access control (media access control, MAC) address of the large-screen device, a protocol (for example, Bluetooth or Wi-Fi direct) supported by the large-screen device, and the like. After an electronic device works in a reader/writer mode and uses the NFC-based communication method provided in embodiments of this application, the electronic device can successfully read the data stored in the NFC tag, quickly discover the large-screen device, and after discovering the large screen device, establish a connection to the large-screen device by using a technology such as Bluetooth or Wi-Fi direct, and perform projection.

For another example, the method may be further applied to audio input control. Specifically, the NFC tag may be attached to an audio playback device (for example, a speaker). Data stored in the NFC tag may include one or more of the following: an identifier of the audio playback device, a MAC address of the audio playback device, a protocol (for example, Bluetooth or Wi-Fi direct) supported by the audio playback device, and the like. After the electronic device works in the reader/writer mode and uses the NFC-based communication method provided in embodiments of this application, the electronic device can successfully read the data stored in the NFC tag, quickly discover the audio playback device, and after discovering the audio playback device, establish a connection to the large-screen device by using a technology such as Bluetooth or Wi-Fi direct, and then send audio to the audio playback device for playback.

For another example, the method may be further applied to quickly accessing a network address stored in the NFC tag, quickly obtaining a picture or a text stored in the NFC tag, and the like.

Figure 2:
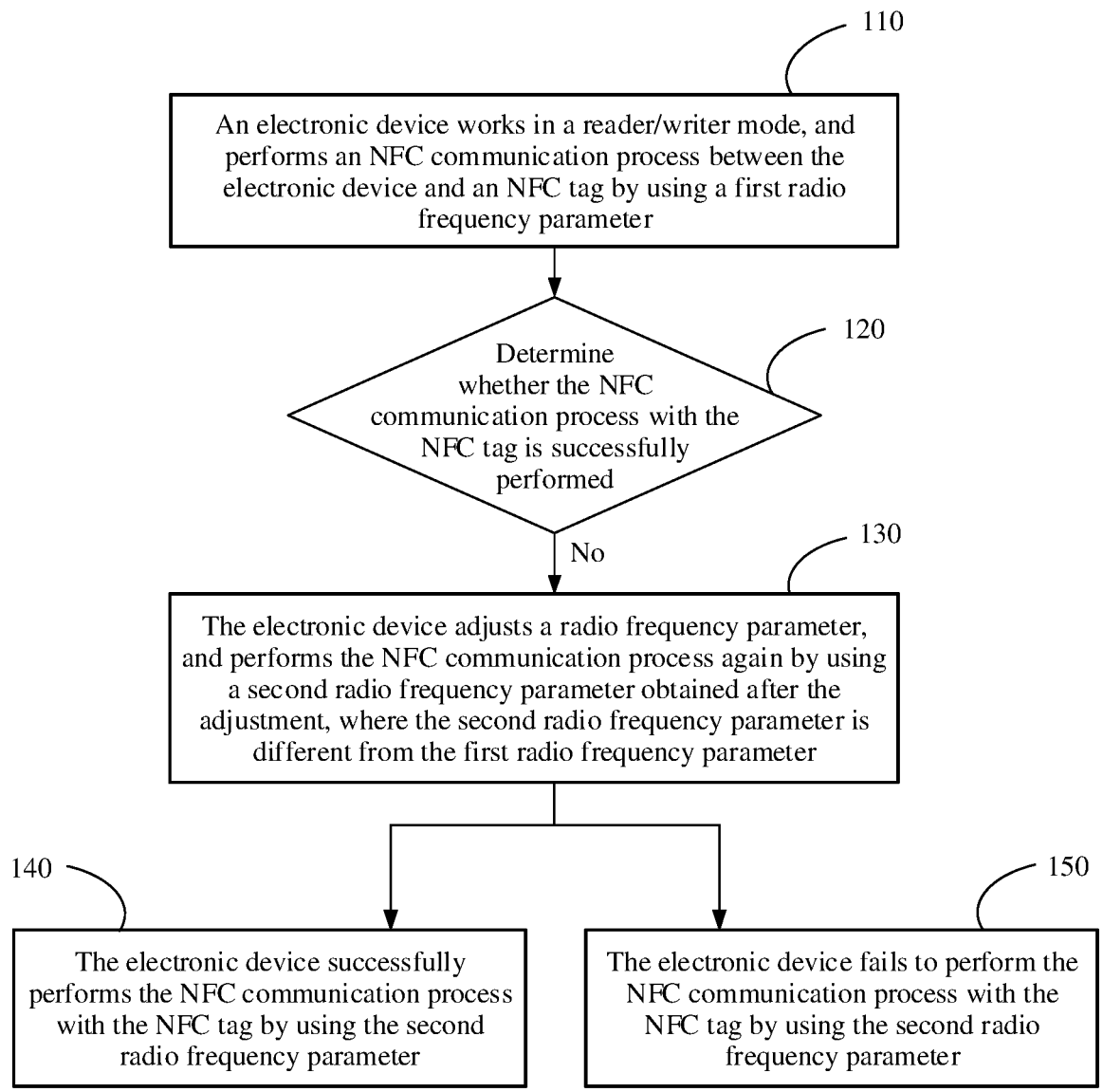
FIG. 2 is a schematic diagram of an NFC-based communication method according to an embodiment of this application.

FIG. 2 is a schematic flowchart of an NFC-based communication method according to an embodiment of this application. As shown in FIG. 2, the method may include the following steps.

Step S110: An electronic device works in a reader/writer mode, and performs an NFC communication process between the electronic device and an NFC tag by using a first radio frequency parameter.

In this embodiment of this application, step S110 may be triggered in the following two manners:

1. In some embodiments, when the electronic device is in a screen-on state and an unlocked state, the electronic device may periodically send a radio frequency signal and generate a radio frequency field; and when the electronic device is in a screen-off state or a screen-locked state, the electronic device may continuously send a radio frequency signal and generate a radio frequency field. In this way, after an NFC tag enters the radio frequency field sent by the electronic device, the electronic device and the NFC tag may perform subsequent steps in the NFC communication process. In other words, the electronic device may independently trigger performing of step S110 in any state.

2. In some other embodiments, in response to a received user operation, the electronic device may start to send a radio frequency signal and generate a radio frequency field. After an NFC tag enters the radio frequency field sent by the electronic device, the electronic device and the NFC tag may perform subsequent steps in the NFC communication process. The user operation may be a tap operation received by the electronic device on a display, an operation of shaking the electronic device, or the like. In other words, the electronic device may be triggered by a user to perform step S110.

Specifically, that an electronic device works in a reader/writer mode means that the electronic device prepares to actively send a radio frequency signal, generate a radio frequency field, and read data from an NFC tag that enters the radio frequency field. In other words, the electronic device prepares to perform the NFC communication process with the NFC tag shown in FIG. 1. The NFC communication process may include a first radio frequency communication process and a second radio frequency communication process.

In step S110, the electronic device performs the NFC communication process between the electronic device and the NFC tag by using the first radio frequency parameter. The first radio frequency parameter includes one or more radio frequency parameters. For physical meanings and specific functions of the one or more radio frequency parameters, refer to related descriptions of the radio frequency parameter in the foregoing embodiments. The first radio frequency parameter is used to: in the NFC communication process between the electronic device and the NFC tag, receive a radio frequency signal sent by the NFC tag, generate a radio frequency signal to be sent to the NFC tag, send a radio frequency signal, and the like.

In some embodiments, the first radio frequency parameter may be any set of radio frequency parameters selected by the electronic device from N sets of pre-stored radio frequency parameters. In some other embodiments, the first radio frequency parameter may be a set of radio frequency parameters having a highest success rate of reading data from the NFC tag in the N sets of radio frequency parameters pre-stored in the electronic device.

Specifically, the electronic device pre-stores the N sets of radio frequency parameters, where N is a positive integer greater than or equal to 1. For a parameter item included in each set of radio frequency parameters, refer to related descriptions of the radio frequency parameter in the foregoing embodiments. Details are not described herein again. Herein, the N sets of radio frequency parameters pre-stored in the electronic device may be obtained in the following two manners:

1. The N sets of radio frequency parameters pre-stored in the electronic device may be preset in the electronic device when the electronic device is delivered from the factory. Specifically, research and development personnel may obtain, through testing or in another manner, N sets of radio frequency parameters that adapt to or are compatible with most NFC tags in the market, and preset the N sets of radio frequency parameters in the electronic device.

2. The N sets of radio frequency parameters pre-stored in the electronic device may be obtained by the electronic device from a cloud server. Specifically, the cloud server may collect, based on data reported by each electronic device, statistics on a success rate that is of reading the data from the NFC tag and that corresponds to each set of radio frequency parameters. The cloud server may periodically deliver, to the electronic device, the N sets of radio frequency parameters having a highest success rate. For a manner in which the cloud server collects statistics on the success rate corresponding to each set of radio frequency parameters, refer to related descriptions in the following embodiments. Details are not described herein.

Step S120: The electronic device determines whether the NFC communication process with the NFC tag is successfully performed.

Specifically, only when all steps in the NFC communication process between the electronic device and the NFC tag shown in FIG. 1 are successfully performed, the electronic device can completely and accurately read data from the NFC tag, that is, the electronic device can successfully perform the NFC communication process with the NFC tag.

In this embodiment of this application, the electronic device may determine, in the following manners, whether the electronic device successfully performs the NFC communication process with the NFC tag.

1. If the electronic device does not receive a complete UID of the NFC tag within a time period T1 after the NFC tag is detected, the electronic device determines that the electronic device fails to perform the NFC communication process with the NFC tag by using the first radio frequency parameter. T1 may be preset.

For details, refer to related descriptions in the embodiment in FIG. 1. When performing the first radio frequency communication process, the electronic device receives ATQA replied by the NFC tag, that is, detects the NFC tag in the radio frequency field.

In some embodiments, if the electronic device does not receive a UID of the NFC tag within T1 after the NFC tag is detected, it indicates that the first radio frequency communication process fails to be performed between the electronic device and the NFC tag, that is, an NFC radio frequency connection fails to be established between the electronic device and the NFC tag. In this case, the electronic device determines that the current NFC communication process fails to be performed with the NFC tag by using the first radio frequency parameter.

2. When a quantity of times of generating a radio frequency lost (RF lost) message by the electronic device is greater than a first value, the electronic device determines that the electronic device fails to perform the NFC communication process with the NFC tag by using the first radio frequency parameter.

For details, refer to FIG. 1. After the electronic device successfully completes the first radio frequency communication process, the electronic device successfully establishes an NFC radio frequency connection to the NFC tag. Then, if the NFC radio frequency connection is unstable or broken due to a hardware structure of the device, a user operation, a radio frequency parameter, or the like, an NFC chip of the electronic device generates RF lost and reports RF lost to the processor. Herein, that the NFC radio frequency connection is unstable or broken specifically means that after performing the first radio frequency communication process, the electronic device and the NFC tag fail to communicate with each other based on content such as a communications interface, a communications protocol, a waveform, and a data encapsulation form that is negotiated in the first radio frequency communication process. For example, the electronic device receives a message that is sent by the NFC tag and that does not conform to the communications protocol, or does not receive a message that needs to be sent by the NFC tag according to the communications protocol.

Therefore, in some embodiments of this application, when the quantity of times of generating RF lost by the electronic device is greater than the first value, it may be considered that no stable and persistent NFC radio frequency connection is currently established between the electronic device and the NFC tag, and it may be determined that the electronic device fails to perform the NFC communication process with the NFC tag by using the first radio frequency parameter. The first value may be preset.

3. In the NFC communication process shown in FIG. 1, if the electronic device does not receive a reply from the NFC tag to a message within a time period T2 after the message is sent, the electronic device determines that the electronic device fails to perform the NFC communication process with the NFC tag by using the first radio frequency parameter. T2 may be preset.

Specifically, if the NFC communication process is successfully performed between the electronic device and the NFC tag, after sending a message, the electronic device may receive a reply from the NFC tag to the message within a specific time period. If the electronic device does not receive the reply from the NFC tag to the message before timeout, the electronic device may determine that the electronic device fails to perform the current NFC communication process with the NFC tag by using the first radio frequency parameter. The message may be any message sent by the electronic device in the embodiment shown in FIG. 1. The message may be referred to as a first message.

For example, after the electronic device sends an instruction used to query an index of a sector used to store data, if the electronic device does not receive, within T2, the index that is of the sector and that is replied by the NFC tag, the electronic device may determine that the electronic device fails to perform the NFC communication process with the NFC tag by using the first radio frequency parameter. For another example, after the electronic device sends, to the NFC tag based on an index of a sector, an instruction used to read data stored in the sector corresponding to the index, if the electronic device does not receive, within T2, the data sent by the NFC tag, the electronic device may determine that the electronic device fails to perform the NFC communication process with the NFC tag by using the first radio frequency parameter.

4. After obtaining an index of a sector that is in the NFC tag and that is used to store data, the electronic device reads, based on the index, the data from the sector corresponding to the NFC tag. If the data is incomplete or inaccurate, the electronic device determines that the electronic device fails to perform the NFC communication process with the NFC tag by using the first radio frequency parameter.

Refer to FIG. 1. When the electronic device performs the second radio frequency communication process, if the data read from the NFC tag is incomplete or inaccurate, the electronic device may determine that the electronic device fails to perform the NFC communication process with the NFC tag by using the first radio frequency parameter.

Specifically, the NFC tag encapsulates the data according to a data encapsulation specification agreed on with the electronic device. After receiving the data sent by the NFC tag, the electronic device may determine, according to the data encapsulation specification, whether the received data is complete or accurate. For example, if the electronic device and the NFC tag agree, in the first radio frequency communication process, on encapsulating the data by using NDEF, the electronic device may determine, based on a data format specified in NDEF, whether the received data is complete or accurate.

In this embodiment of this application, in the foregoing four manners, a condition used by the electronic device to determine that the NFC communication process fails to be performed with the NFC tag by using the first radio frequency parameter may be referred to as a preset condition.

Step S130: When the electronic device fails to perform the NFC communication process with the NFC tag by using the first radio frequency parameter, the electronic device performs the NFC communication process again by using a second radio frequency parameter, where the second radio frequency parameter is different from the first radio frequency parameter.

In some embodiments, when the electronic device fails to perform the NFC communication process with the NFC tag by using the first radio frequency parameter, the electronic device may independently perform the NFC communication process again by using the second radio frequency parameter. In this way, the electronic device can independently adjust the radio frequency parameter without user perception, to improve a success rate of reading the data from the NFC tag.

In some other embodiments, after the electronic device fails to perform the NFC communication process with the NFC tag by using the first radio frequency parameter, the electronic device may perform the NFC communication process again by using the second radio frequency parameter in response to a received user operation. To be specific, when failing to read the data from the NFC tag, the electronic device may adjust the radio frequency parameter under triggering of the user and read the data from the NFC tag again.

Figure 3:
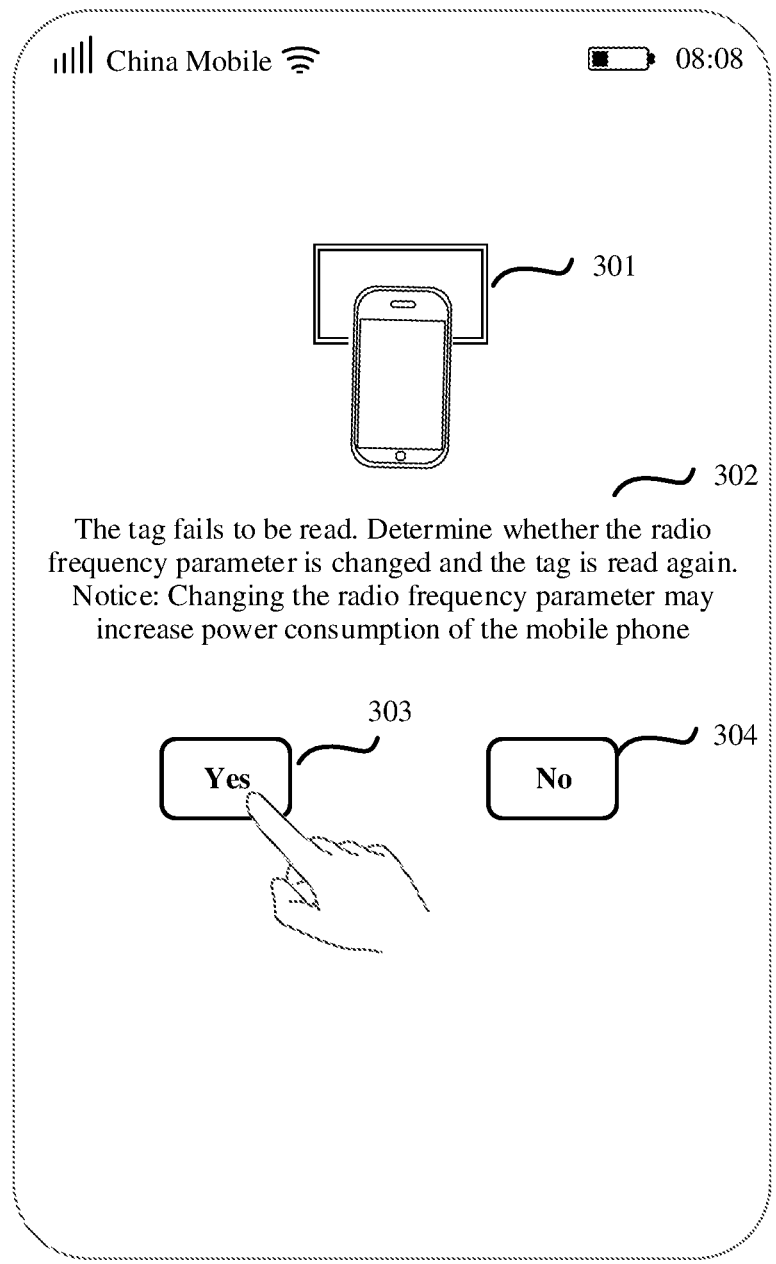
FIG. 3 is a schematic diagram of a user interface according to an embodiment of this application.

FIG. 3 shows an example of a user operation for triggering an electronic device to perform an NFC communication process with an NFC tag by using a second radio frequency parameter. As shown in FIG. 3, when the electronic device fails to perform the NFC communication process with the NFC tag by using a first radio frequency parameter, the electronic device may display a user interface 31. A picture 301, a text 302, a control 303, and a control 304 are displayed in the user interface 31. The picture 301 and the text 302 may be used to prompt a user with a fact that the electronic device is currently reading data from the NFC tag. The control 303 may be used to listen to a user operation (for example, a tap operation or a touch operation). The electronic device may perform the NFC communication process with the NFC tag again by using the second radio frequency parameter in response to the user operation received on the control 303. In this embodiment of this application, the user interface 31 may be referred to as a first user interface, and the control 303 may be referred to as a first control.

In addition to the operation entered by the user on a display of the electronic device shown in FIG. 3, in embodiments of this application, the user operation for triggering the electronic device to perform the NFC communication process with the NFC tag by using the second radio frequency parameter may be further an operation in which the electronic device approaches the NFC tag and that is detected by the electronic device. Usually, if the electronic device does not read data from the NFC tag for a long time, the user usually moves the electronic device closer to the NFC tag, to improve a success rate of reading the data from the NFC tag. Therefore, in embodiments of this application, when detecting the operation that the electronic device approaches the NFC tag, the electronic device determines that the user intends to successfully read the data from the NFC tag, to change the radio frequency parameter, and performs the NFC communication process with the NFC tag again by using the second radio frequency parameter obtained after the change. Herein, the electronic device may determine, based on strength of a received radio frequency signal of the NFC tag, whether the electronic device is close to the NFC tag. When the electronic device is closer to the NFC tag, strength of the received radio frequency signal of the NFC tag is stronger.

In addition to the foregoing listed cases, the user operation for triggering the electronic device to perform the NFC communication process with the NFC tag by using the second radio frequency parameter may be further implemented in another form. This is not limited in embodiments of this application. For example, the user operation may alternatively be an operation that is of shaking the electronic device up and down and that is detected by the electronic device. It may be understood that, in such a manner in which the electronic device triggers, by performing the user operation, the electronic device to perform the NFC communication process with the NFC tag by using the second radio frequency parameter, the user may independently determine whether to adjust the radio frequency parameter, to provide the user with more selections.

Specifically, the second radio frequency parameter includes one or more radio frequency parameters. That the second radio frequency parameter is different from the first radio frequency parameter means that some or all radio frequency parameter items in the second radio frequency parameter are different from the first radio frequency parameter. In other words, when the electronic device fails to perform the NFC communication process with the NFC tag by using the first radio frequency parameter, the electronic device adjusts some or all parameters in the first radio frequency parameter, and performs the NFC communication process with the NFC tag again by using adjusted radio frequency parameters.

When the electronic device performs the NFC communication process with the NFC tag again by using the second radio frequency parameter obtained after the adjustment, in some embodiments, the electronic device may completely perform all the steps shown in FIG. 1. In some other embodiments, the electronic device may perform only some steps shown in FIG. 1. For example, the electronic device may perform steps starting from a step in which the NFC communication process fails to be performed by using the first radio frequency parameter, and does not need to perform the steps starting from the first step in FIG. 1. In this way, efficiency of reading the data from the NFC tag by the electronic device can be improved. In the following embodiments, how the electronic device performs the NFC communication process with the NFC tag again by using the second radio frequency parameter is described in details by using an example. Details are not described herein.

In embodiments of this application, the electronic device may adjust the radio frequency parameter by using different policies based on different manners of determining whether the NFC communication process with the NFC tag is successfully performed. In embodiments of this application, a processor of the electronic device may indicate the NFC chip to adjust the radio frequency parameter, and then the NFC chip performs the NFC communication process with the NFC tag again by using an adjusted radio frequency parameter. In the following embodiments, descriptions are provided by using an example in which the adjusted radio frequency parameter is the second radio frequency parameter. The following describes several possible policies for adjusting the radio frequency parameter.

1. When the electronic device determines, in Manner 1, that the NFC communication process with the NFC tag fails to be performed, it indicates that an NFC radio frequency connection fails to be established between the electronic device and the NFC tag. In this case, the electronic device may adjust a large quantity of radio frequency parameter items in the first radio frequency parameter and/or adjust the first radio frequency parameter at a large amplitude, so that the electronic device quickly and successfully establishes an NFC radio frequency connection to the NFC tag by using the second radio frequency parameter.

That the electronic device adjusts a large quantity of parameter items in the first radio frequency parameter means that the electronic device adjusts parameter items whose quantity exceeds a threshold quantity in the first radio frequency parameter. For example, the electronic device may simultaneously adjust power, a waveform of a carrier, an amplitude (represented by a modulation index) of the carrier, a phase of the carrier, and the like.

Figure 4A:
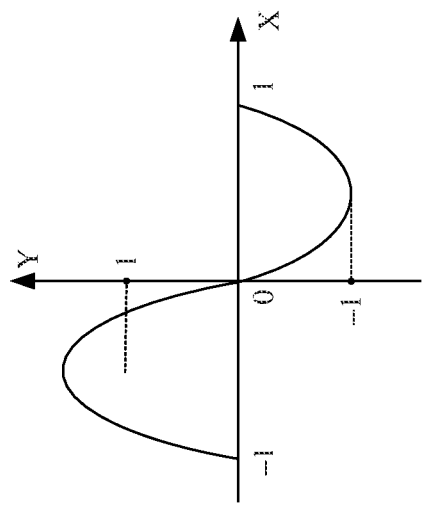
FIG. 4A to FIG. 4C are schematic diagrams of carriers according to embodiments of this application.
Figure 4B:
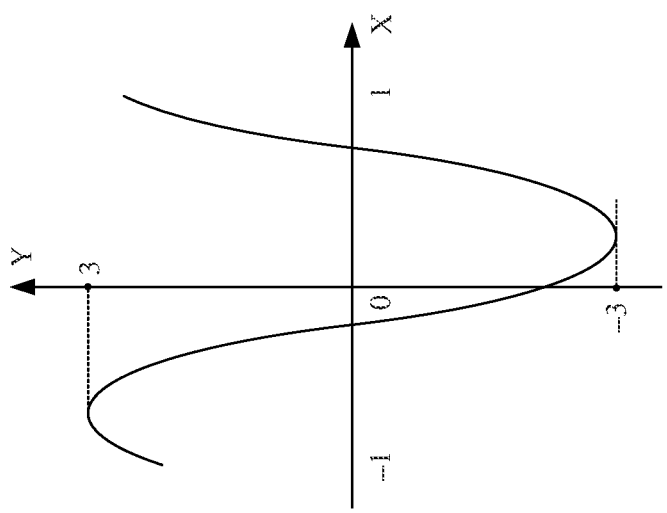

That the electronic device adjusts the first radio frequency parameter at a large amplitude means that a difference between the parameter existing before the adjustment and a parameter obtained after the adjustment exceeds a preset value. FIG. 4A shows an example of a carrier shape used before an electronic device adjusts a radio frequency parameter. FIG. 4B shows a carrier shape used after an electronic device adjusts a radio frequency parameter at a large amplitude. As shown in FIG. 4A and FIG. 4B, both a phase and an amplitude of a carrier are adjusted at a large amplitude.

In embodiments of this application, when the electronic device adjusts a large quantity of parameter items in the first radio frequency parameter and/or adjusts the first radio frequency parameter at a large amplitude to obtain the second radio frequency parameter, it may be considered that a difference between the second radio frequency parameter and the first radio frequency parameter exceeds a preset range.

After the electronic device determines, in Manner 1, that the NFC communication process with the NFC tag fails to be performed, in some embodiments, the electronic device may perform the NFC communication process with the NFC tag by using the second radio frequency parameter and starting from the step of obtaining the UID of the NFC tag shown in FIG. 1. For example, it can be learned with reference to FIG. 1 that the electronic device first generates a radio frequency field by using the first radio frequency parameter and detects an NFC tag, then performs anti-collision processing, adjusts the radio frequency parameter when the electronic device does not receive a complete UID of the NFC tag, performs the anti-collision processing again by using the second radio frequency parameter obtained after the adjustment, receives the complete UID of the NFC tag, and continues to perform a subsequent operation (for details, refer to the second radio frequency communication process in FIG. 1). In some other embodiments, the electronic device may alternatively perform the NFC communication process with the NFC tag again by using the second radio frequency parameter and starting from the first step shown in FIG. 1.

2. When the electronic device determines, in Manner 2, 3, or 4, that the NFC communication process with the NFC tag fails to be performed, an NFC radio frequency connection established between the electronic device and the NFC tag may be unstable. In this case, the electronic device may adjust a small quantity of radio frequency parameter items in the first radio frequency parameter and/or adjust the first radio frequency parameter at a small amplitude, that is, slightly adjust the radio frequency parameter, so that the electronic device can establish a stable NFC radio frequency connection to the NFC tag by using the second radio frequency parameter.

That the electronic device adjusts a small quantity of parameter items in the first radio frequency parameter means that the electronic device adjusts parameter items whose quantity does not exceed a threshold quantity in the first radio frequency parameter. For example, the electronic device may adjust only a waveform of a carrier and a phase of the carrier.

Figure 4C:
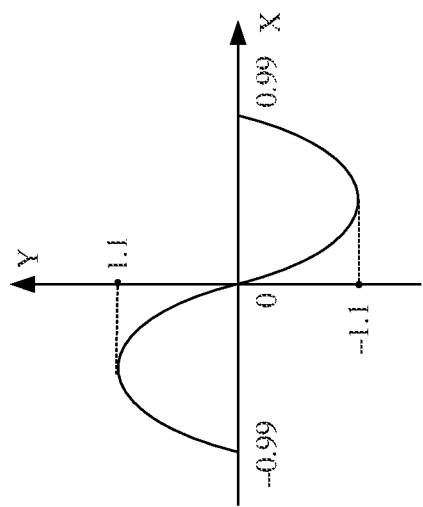

That the electronic device adjusts the first radio frequency parameter at a small amplitude means that a difference between the parameter existing before the adjustment and a parameter obtained after the adjustment does not exceed a preset value. FIG. 4A shows an example of a carrier shape used before an electronic device adjusts a radio frequency parameter. FIG. 4C shows a carrier shape used after an electronic device slightly adjusts a radio frequency parameter. As shown in FIG. 4A and FIG. 4C, a phase and an amplitude of a carrier are adjusted only at a small amplitude.

In embodiments of this application, when the electronic device adjusts a small quantity of parameter items in the first radio frequency parameter and/or adjusts the first radio frequency parameter at a small amplitude to obtain the second radio frequency parameter, it may be considered that a difference between the second radio frequency parameter and the first radio frequency parameter does not exceed a preset range.

In some embodiments, after the electronic device determines, in Manner 2, 3 or 4, that the NFC communication process with the NFC tag fails to be performed, the electronic device may perform the NFC communication process with the NFC tag again by using the second radio frequency parameter and starting from the step in which the NFC communication process fails to be performed by using the first radio frequency parameter. For example, it can be learned with reference to FIG. 1 that the electronic device first generates a radio frequency field by using the first radio frequency parameter and detects an NFC tag, performs anti-collision processing and receives a complete UID of the NFC tag, and then receives an index and reads data based on the index. If the electronic device reads incomplete data, the electronic device may adjust the radio frequency parameter, and perform, again by using the second radio frequency parameter obtained after the adjustment, the step of reading data from the NFC tag based on the index of the sector.

In some other embodiments, after the electronic device determines, in Manner 2, 3, or 4, that the NFC communication process with the NFC tag fails to be performed, the electronic device may alternatively perform the NFC communication process with the NFC tag again by using the second radio frequency parameter and starting from the first step shown in FIG. 1. For example, it can be learned with reference to FIG. 1 that the electronic device first generates a radio frequency field by using the first radio frequency parameter and detects an NFC tag, performs anti-collision processing and receives a complete UID of the NFC tag, and then receives an index and reads data based on the index. If the electronic device reads incomplete data, the electronic device adjusts the radio frequency parameter, generates the radio frequency field again by using the second radio frequency parameter obtained after the adjustment, detects the NFC tag, and performs subsequent steps of performing anti-collision processing, receiving the complete UID of the NFC tag, receiving the index, reading the data based on the index, and the like.

In some embodiments, the electronic device may pre-store specific adjustment policies of the radio frequency parameter that respectively correspond to the foregoing four manners of determining that the NFC communication process fails to be performed. The adjustment policy may specifically include a radio frequency parameter item adjusted by the electronic device, and an adjustment amplitude or a manner of each radio frequency parameter item that needs to be adjusted. Adjustment policies corresponding to different manners may be different. For details, refer to the foregoing related descriptions. When determining, in a manner, that the NFC communication process fails to be performed, the electronic device adjusts the radio frequency parameter by using an adjustment policy corresponding to the manner.

After step S130 is performed, because the electronic device adjusts the radio frequency parameter, that is, adjusts performance of receiving and sending a radio frequency signal, there is a higher probability that the electronic device successfully performs the NFC communication process with the NFC tag again.

After step S130 is performed, the electronic device may successfully perform the NFC communication process with the NFC tag by using the second radio frequency parameter, or may fail to perform the NFC communication process. In other words, after step S130, step S140 or step S150 may be performed.

Step S140: The electronic device successfully performs the NFC communication process with the NFC tag by using the second radio frequency parameter, that is, the electronic device successfully reads the complete data from the NFC tag.

Herein, a manner in which the electronic device determines whether the electronic device successfully performs the NFC communication process with the NFC tag by using the second radio frequency parameter is the same as a manner in which the electronic device determines whether the electronic device successfully performs the NFC communication process with the NFC tag by using the first radio frequency parameter. For details, refer to related descriptions in step S120.

In embodiments of this application, after successfully reading the complete data from the NFC tag, the electronic device may perform a corresponding operation based on the data, for example, projecting, accessing a website, or storing only the data. For details, refer to the foregoing related descriptions of the application scenario of this application. For example, the NFC tag may be built in a first device, or may be attached to the first device. After reading the complete data (for example, an identifier and a MAC address of the first device) from the NFC tag, the electronic device may establish a communication connection (for example, a Wi-Fi direct connection) to the first device based on the data, and send multimedia data such as audio and a video to the first device through the communication connection. The first device plays the multimedia. The first device may be a television, a speaker, or the like.

In embodiments of this application, after successfully performing the NFC communication process with the NFC tag, the electronic device may further store related information to facilitate a subsequent operation. The following lists two possible storage manners.

1. In some embodiments, the electronic device may store a radio frequency parameter used when the electronic device successfully performs the NFC communication process with the NFC tag. For example, the radio frequency parameter used when the electronic device successfully performs the NFC communication process with the NFC tag is the second radio frequency parameter. The electronic device may associate the UID of the NFC tag with the second radio frequency parameter. In some other embodiments, the electronic device may write the UID of the NFC tag and the second radio frequency parameter to the NFC tag for storage, or upload the UID and the second radio frequency parameter to a cloud for storage.

Then, if the electronic device performs the NFC communication process with the same NFC tag again, after obtaining the UID of the NFC tag, the electronic device may find, from a local end, the NFC tag, or the cloud, the second radio frequency parameter corresponding to the UID, and automatically perform the NFC communication process with the NFC tag by using the second radio frequency parameter. In this way, it can be ensured that there may be a high success rate in each NFC communication process subsequently performed between the electronic device and the NFC tag.

Further, when the UID of the NFC tag and the second radio frequency parameter are stored in the NFC tag or the cloud, after obtaining the UID of the NFC tag, another electronic device may find, from the NFC tag or the cloud, the second radio frequency parameter corresponding to the UID, and automatically perform the NFC communication process with the NFC tag by using the second radio frequency parameter.

Therefore, in Manner 1, a success rate of reading data from the NFC tag by any electronic device can be improved.

2. In some other embodiments, the electronic device may further store a series of information in a process of reading data from the NFC tag, for example, a quantity of times that the electronic device reads the data from the NFC tag, a quantity of times that the electronic device successfully reads the data from the NFC tag, and related information (such as a tag type and a manufacturer) of the NFC tag. In some other embodiments, the electronic device may write the series of information to the NFC tag for storage, or upload the series of information to a cloud for storage.

In an implementation, the series of information in the process of reading the data by the electronic device from the NFC tag may be used as a reference for a radio frequency parameter used when the electronic device reads the data from the NFC tag, to improve a success rate of reading the data from the NFC tag by any electronic device. For example, when reading an NFC tag produced by a manufacturer, the electronic device may reference a radio frequency parameter used when another NFC tag produced by the manufacturer is successfully read.

In another implementation, a cloud server may obtain data reported by a plurality of electronic devices, collect statistics on N sets of radio frequency parameters having a highest success rate of reading data from the NFC tag, and may periodically deliver the N sets of radio frequency parameters to each electronic device. Further, the cloud server may collect statistics based on different types of NFC tags or manufacturers, and different classifications of models of the electronic devices. Details are not described herein. This can improve a success rate of reading the data from the NFC tag by the electronic device.

Step S150: The electronic device fails to perform the NFC communication process with the NFC tag by using the second radio frequency parameter.

In this embodiment of this application, if the electronic device still fails to perform the NFC communication process with the NFC tag by using the second radio frequency parameter, the electronic device may repeatedly perform step S130 until the electronic device successfully read the complete and accurate data from the NFC tag.

In some embodiments, if the electronic device still fails to perform the NFC communication process with the NFC tag within a time period T3 after step S110 starts, or after the electronic device adjusts the radio frequency parameter a quantity of times that exceeds a second value, that is, fails to read the complete and accurate data from the NFC tag, the electronic device may search, based on the obtained UID of the NFC tag, the local end, the NFC tag, or the cloud for a radio frequency parameter that is stored in association with the UID. If the radio frequency parameter that is stored in association with the UID is found, the electronic device performs the NFC communication process with the NFC tag again by using the radio frequency parameter that is stored in association with the UID. In this case, the electronic device may re-perform the NFC communication process with the NFC tag starting from the first step in the process shown in FIG. 1.

According to the NFC-based communication method shown in FIG. 2, the electronic device works in the reader/writer mode and performs the NFC communication process with the NFC tag. When failing to perform the NFC communication process, the electronic device may adjust the currently used radio frequency parameter, and re-perform the NFC communication process with the NFC tag by using the adjusted radio frequency parameter. In this way, stability of the radio frequency signal between the electronic device and the NFC tag can be adjusted by adjusting the radio frequency parameter, to improve a success rate of reading the data from the NFC tag.

According to the NFC-based communication method shown in FIG. 2, when the user uses the electronic device to read the data from the NFC tag, if performance of the radio frequency signal between the electronic device and the NFC tag is poor, the electronic device independently adjusts the radio frequency parameter, to improve performance of the radio frequency signal between the electronic device and the NFC tag, so that a success rate of reading the data from the NFC tag can be improved without user perception. In this way, user experience can be improved.

To perform the NFC-based communication method provided in embodiments of this application, embodiments of this application further provide a corresponding system and apparatus. The following describes in detail a system and an apparatus provided in embodiments of this application.

Figure 5:
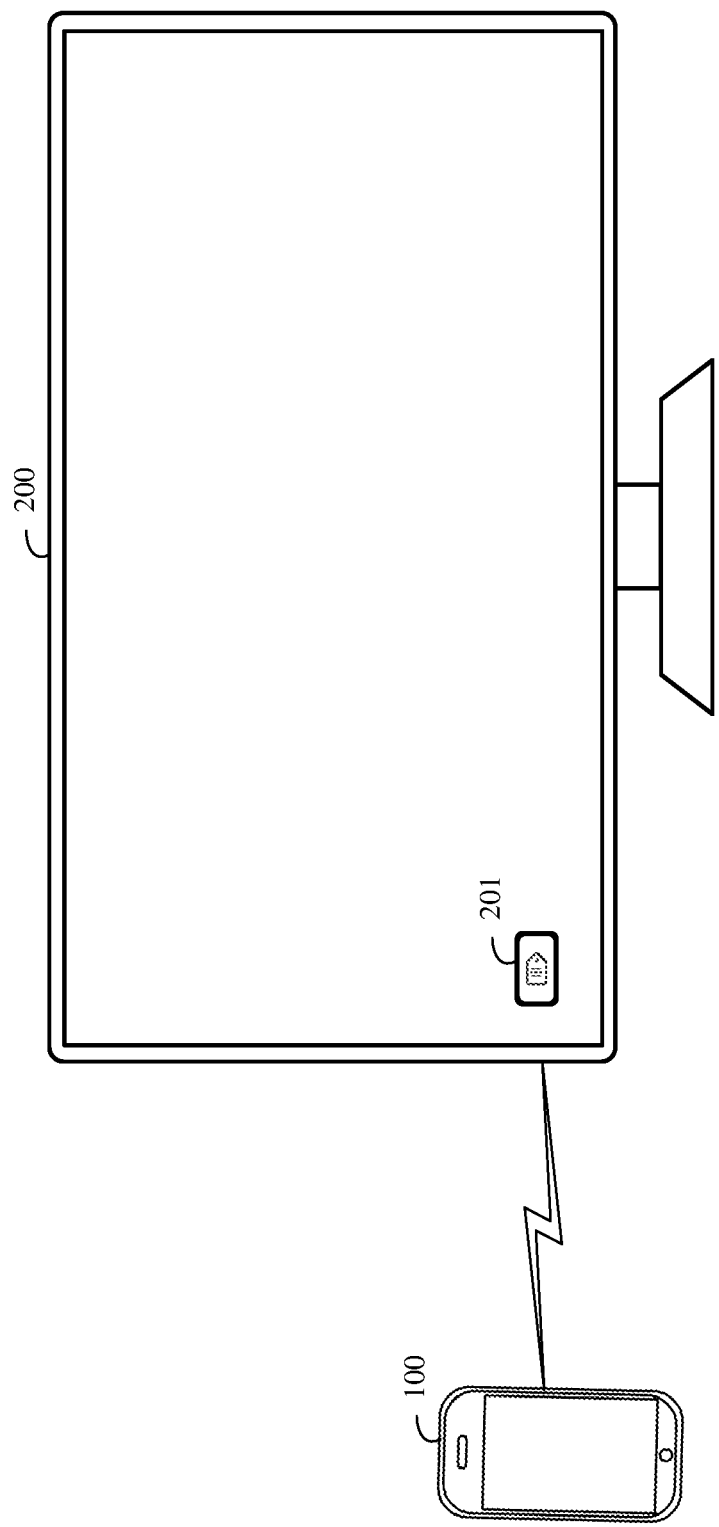
FIG. 5 is a schematic diagram of a structure of a communications system according to an embodiment of this application.

FIG. 5 shows a communications system 10 according to an embodiment of this application. As shown in FIG. 5, the communications system 10 may include an electronic device 100 and a first device 200. The electronic device 100 supports NFC and works in an NFC reader/writer mode. An NFC tag 201 may be built in or disposed in the first device 200, or the NFC tag 201 may be attached to the first device 200. The NFC tag 201 stores data used to establish a communication connection between the electronic device 100 and the first device 200, for example, an identifier and a MAC address of the first device.

The first device 200 may be a multimedia playback device such as a television or a speaker. The first device 200 is configured to: establish a communication connection (for example, a Wi-Fi direct connection) to the electronic device 100, and receive, through the communication connection, multimedia data such as audio and a video that is sent by the electronic device 100. The first device 200 may be further configured to play multimedia based on the received multimedia data.

The electronic device 100 supports an NFC technology, and may communicate with another device by using the NFC technology. The electronic device may work in the reader/writer mode, perform an operation on an electronic device side in the NFC communication process described in the foregoing embodiment in FIG. 1, and read the data stored in the NFC tag. The electronic device 100 may be configured to perform the NFC-based communication method shown in the embodiment in FIG. 2.

A type of the electronic device 100 is not limited in embodiments of this application. The electronic device 100 may be a portable electronic device such as a mobile phone, a tablet computer, a personal digital assistant (personal digital assistant, PDA), a wearable device (for example, a smart band or a smartwatch), a laptop (laptop) computer, or a laptop (laptop) computer having a touch-sensitive surface (for example, a touch panel). An example embodiment of the portable electronic device includes but is not limited to a portable electronic device using iOS, Android, Microsoft, or another operating system.

The NFC tag 201 supports the NFC technology, and may communicate with another device by using the NFC technology. The NFC tag 201 may perform an operation on an NFC tag side in the NFC communication process described in the foregoing embodiment in FIG. 1. A type of the NFC tag is not limited in embodiments of this application. For details, refer to related descriptions in the foregoing embodiments.

The following describes in detail specific structures of the electronic device 100 and the NFC tag provided in embodiments of this application.

Figure 6A:
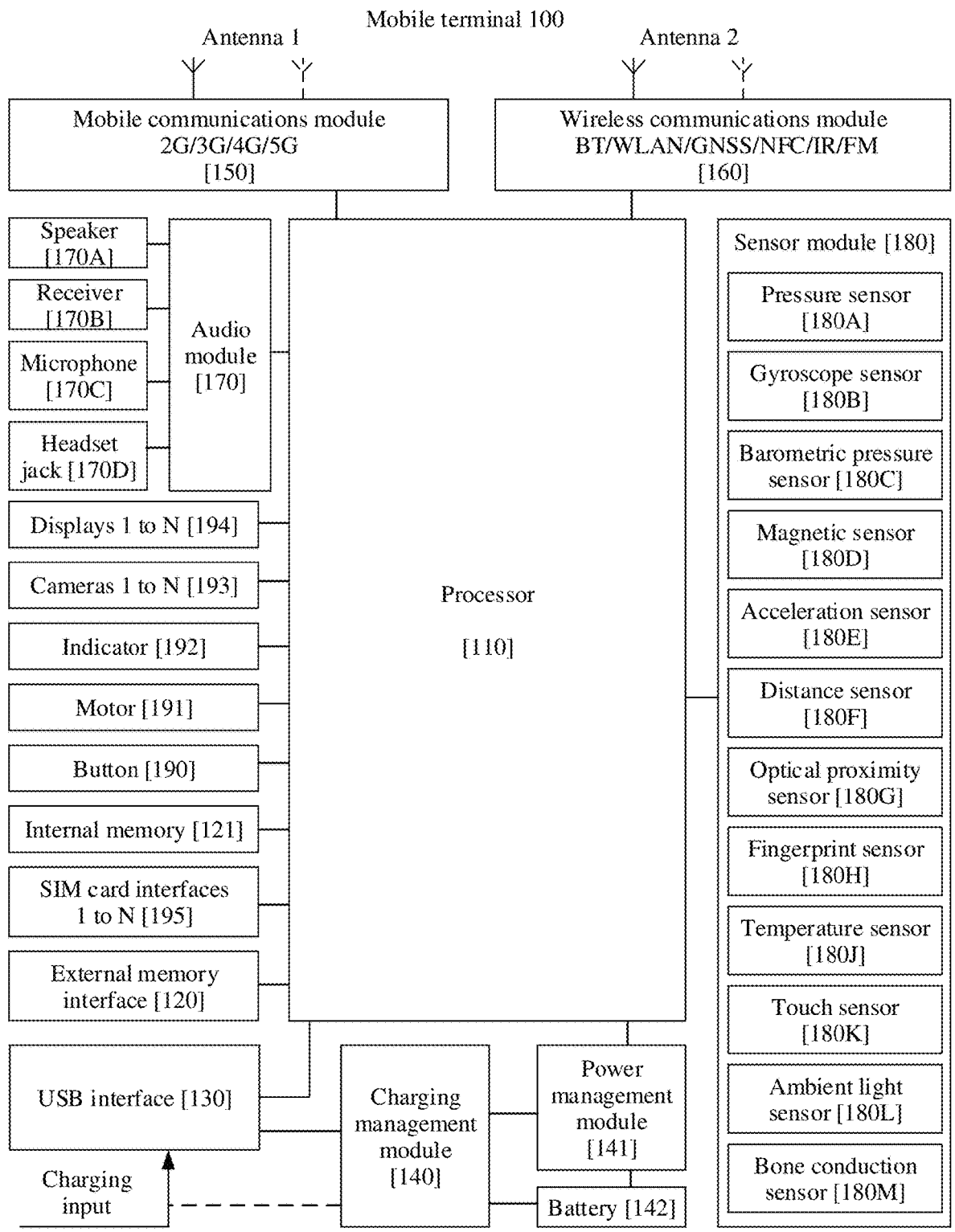
FIG. 6A is a schematic diagram of a hardware structure of an electronic device according to an embodiment of this application.

FIG. 6A is a schematic diagram of a structure of the electronic device 100.

It should be understood that the electronic device 100 shown in FIG. 6A is merely an example, and the electronic device 100 may have more or fewer components than those shown in FIG. 6A, or may combine two or more components, or may have different component configurations. The components shown in the figure may be implemented in hardware including one or more signal processing and/or application-specific integrated circuits, software, or a combination of hardware and software.

As shown in FIG. 6A, the electronic device 100 may include a processor 110, an external memory interface 120, an internal memory 121, a universal serial bus (universal serial bus, USB) interface 130, a charging management module 140, a power management module 141, a battery 142, an antenna 1, an antenna 2, a mobile communications module 150, a wireless communications module 160, an audio module 170, a speaker 170A, a receiver 170B, a microphone 170C, a headset jack 170D, a sensor module 180, a button 190, a motor 191, an indicator 192, a camera 193, a display 194, a subscriber identification module (subscriber identification module, SIM) card interface 195, and the like. The sensor module 180 may include a pressure sensor 180A, a gyroscope sensor 180B, a barometric pressure sensor 180C, a magnetic sensor 180D, an acceleration sensor 180E, a distance sensor 180F, an optical proximity sensor 180G, a fingerprint sensor 180H, a temperature sensor 180J, a touch sensor 180K, an ambient light sensor 180L, a bone conduction sensor 180M, and the like.

The processor 110 may include one or more processing units. For example, the processor 110 may include an application processor (application processor, AP), a modem processor, a graphics processing unit (graphics processing unit, GPU), an image signal processor (image signal processor, ISP), a controller, a memory, a video codec, a digital signal processor (digital signal processor, DSP), a baseband processor, or the like.

A memory may be further disposed in the processor 110, and is configured to store instructions and data.

The charging management module 140 is configured to receive charging input from a charger. The power management module 141 is configured to connect to the battery 142, the charging management module 140, and the processor 110. The power management module 141 receives input of the battery 142 and/or the charging management module 140, to supply power to the processor 110, the internal memory 121, an external memory, the display 194, the camera 193, the wireless communications module 160, and the like.

A wireless communications function of the electronic device 100 may be implemented through the antenna 1, the antenna 2, the mobile communications module 150, the wireless communications module 160, the modem processor, the baseband processor, and the like.

The antenna 1 and the antenna 2 are configured to send and receive electromagnetic wave signals. Each antenna in the electronic device 100 may be configured to cover one or more communication frequency bands. Different antennas may be further multiplexed, to improve antenna utilization. For example, the antenna 1 may be multiplexed as a diversity antenna of a wireless local area network. In some other embodiments, the antenna may be used in combination with a tuning switch.

The mobile communications module 150 may provide a wireless communication solution that includes 2G/3G/4G/5G or the like and that is applied to the electronic device 100. The mobile communications module 150 may include at least one filter, a switch, a power amplifier, a low noise amplifier (low noise amplifier, LNA), and the like. The mobile communications module 150 may receive an electromagnetic wave through the antenna 1, perform processing such as filtering and amplification on the received electromagnetic wave, and transmit a processed electromagnetic wave to the modem processor for demodulation. The mobile communications module 150 may further amplify a signal modulated by the modem processor, and convert an amplified signal into an electromagnetic wave for radiation through the antenna 1. In some embodiments, at least some function modules of the mobile communications module 150 may be disposed in the processor 110. In some embodiments, at least some function modules of the mobile communications module 150 and at least some modules of the processor 110 may be disposed in a same device.

The modem processor may include a modulator and a demodulator. The modulator is configured to modulate a to-be-sent low-frequency baseband signal into a medium or high frequency signal. The demodulator is configured to demodulate a received electromagnetic wave signal into a low-frequency baseband signal. Then the demodulator transmits the low-frequency baseband signal obtained through demodulation to the baseband processor for processing. The baseband processor processes the low-frequency baseband signal, and then transmits a processed signal to the application processor. The application processor outputs a sound signal by using an audio device (which is not limited to the speaker 170A, the receiver 170B, or the like), or displays an image or a video on the display 194. In some embodiments, the modem processor may be an independent device.

The wireless communications module 160 may provide a wireless communication solution that includes a wireless local area network (wireless local area network, WLAN) (for example, a wireless fidelity (wireless fidelity, Wi-Fi) network), Bluetooth (Bluetooth, BT), a global navigation satellite system (global navigation satellite system, GNSS), frequency modulation (frequency modulation, FM), a near field communication (near field communication, NFC) technology, an infrared (infrared, IR) technology, and the like and that is applied to the electronic device 100. The wireless communications module 160 may be one or more devices integrating at least one communications processing module. The wireless communications module 160 receives an electromagnetic wave through the antenna 2, performs frequency modulation and filtering processing on an electromagnetic wave signal, and sends a processed signal to the processor 110. The wireless communications module 160 may further receive a to-be-sent signal from the processor 110, perform frequency modulation and amplification on the signal, and convert a processed signal into an electromagnetic wave for radiation through the antenna 2.

In embodiments of this application, the wireless communications module 160 may include an NFC chip, and the NFC chip is configured to provide an NFC solution applied to the electronic device 100.

Specifically, the NFC chip is configured to: send a radio frequency signal through an antenna, to provide a radio frequency field, and communicate with an NFC tag through the radio frequency field. The NFC chip is specifically configured to modulate to-be-sent information into an inductance coil inside the antenna (for example, regularly change impedance of the inductance coil), to regularly change a load of the inductance coil inside the antenna in the NFC tag in the radio frequency field, so as to send the radio frequency signal and implement information transfer.

In some embodiments, the NFC chip may be configured to parse an instruction that is based on the bottom-layer protocol ISO/IEC 14443-3, and may further perform a corresponding processing operation based on a parsing result.

In some embodiments, when receiving an instruction that is based on the upper-layer protocol ISO/IEC 14443-4, the NFC chip may send a processed instruction to the processor 110, and the processor 110 parses the instruction and performs a corresponding operation in response to the instruction. The processor 110 may generate a to-be-sent signal that is based on the upper-layer protocol ISO/IEC 14443-4, and send the signal to the NFC chip. The NFC chip converts the signal into a radio frequency signal through the antenna, and sends the radio frequency signal.

In some embodiments, the antenna 1 and the mobile communications module 150 in the electronic device 100 are coupled, and the antenna 2 and the wireless communications module 160 are coupled, so that the electronic device 100 can communicate with a network and another device by using a wireless communications technology. The wireless communications technology may include a Global System for Mobile Communications (Global System for Mobile communication, GSM), a general packet radio service (general packet radio service, GPRS), Code Division Multiple Access (Code Division Multiple Access, CDMA), Wideband Code Division Multiple Access (Wideband Code Division Multiple Access, WCDMA), time-division code division multiple access (time-division code division multiple access, TD-CDMA), Long Term Evolution (Long Term Evolution, LTE), BT, a GNSS, WLAN, NFC, FM, an IR technology, and/or the like. The GNSS may include a global positioning system (global positioning system, GPS), a global navigation satellite system (global navigation satellite system, GLONASS), a BeiDou navigation satellite system (BeiDou navigation satellite system, BDS), a quasi-zenith satellite system (quasi-zenith satellite system, QZSS), and/or a satellite based augmentation system (satellite based augmentation system, SBAS).

The electronic device 100 may implement a display function by using the GPU, the display 194, the application processor, and the like. The GPU is a microprocessor for image processing, and is connected to the display 194 and the application processor. The GPU is configured to: perform mathematical and geometric calculation, and render an image. The processor 110 may include one or more GPUs that execute program instructions to generate or change display information. The display 194 is configured to display an image, a video, and the like. The display 194 includes a display panel. The electronic device 100 may implement a photographing function by using the ISP, the camera 193, the video codec, the GPU, the display 194, the application processor, and the like. The ISP is configured to process data fed back by the camera 193. The camera 193 is configured to capture a static image or a video.

The external memory interface 120 may be configured to connect to an external memory card such as a micro SD card, to extend a storage capability of the electronic device 100.

The internal memory 121 may be configured to store computer executable program code, and the executable program code includes instructions. The processor 110 runs the instructions stored in the internal memory 121, to perform various function applications of the electronic device 100 and data processing. The internal memory 121 may be configured to store an application required for performing the NFC-based communication method provided in embodiments of this application. In some embodiments, the internal memory 121 may be further configured to store data generated or created by the electronic device when the electronic device performs the NFC-based communication method, for example, a UID of the NFC tag and a radio frequency parameter used when an NFC communication process with the NFC tag is successfully performed, for another example, a series of information used when the NFC communication process with the NFC tag is successfully performed. For details, refer to related descriptions of the method embodiment in FIG. 5.

In embodiments of this application, the internal memory 121 may be further configured to store N sets of radio frequency parameters. The N sets of radio frequency parameters may be preset before delivery of the electronic device, or may be periodically delivered by a cloud server to the electronic device.

In embodiments of this application, the processor 110 may be configured to determine whether the electronic device successfully performs the NFC communication process with the NFC tag. For a specific determining manner, refer to related descriptions in the foregoing method embodiment.

In embodiments of this application, the processor 110 may be further configured to: when the electronic device fails to perform the NFC communication process with the NFC tag by using the first radio frequency parameter, indicate the NFC chip to adjust the radio frequency parameter, and indicate the NFC chip to re-perform the NFC communication process with the NFC tag by using the second radio frequency parameter obtained after the adjustment. For defining and determining manners of the first radio frequency parameter and the second radio frequency parameter, refer to related descriptions in the foregoing method embodiments.

The electronic device 100 may implement an audio function by using the audio module 170, the speaker 170A, the receiver 170B, the microphone 170C, the headset jack 170D, the application processor, and the like.

The pressure sensor 180A is configured to sense a pressure signal, and may convert the pressure signal into an electrical signal. The gyroscope sensor 180B may be configured to determine a motion posture of the electronic device 100. The barometric pressure sensor 180C is configured to measure barometric pressure. The magnetic sensor 180D includes a Hall effect sensor. The acceleration sensor 180E may detect accelerations in various directions (usually on three axes) of the electronic device 100. The distance sensor 180F is configured to measure a distance. The optical proximity sensor 180G may include, for example, a light-emitting diode (LED) and an optical detector such as a photodiode. The ambient light sensor 180L is configured to sense ambient light brightness. The fingerprint sensor 180H is configured to collect a fingerprint. The temperature sensor 180J is configured to detect a temperature.

The touch sensor 180K is also referred to as a "touch panel". The touch sensor 180K may be disposed on the display 194, and the touch sensor 180K and the display 194 constitute a touchscreen, which is also referred to as a "touch screen". The touch sensor 180K is configured to detect a touch operation performed on or near the touch sensor 180K. The touch sensor may transfer the detected touch operation to the application processor, to determine a type of a touch event. The display 194 may provide a visual output related to the touch operation.

The bone conduction sensor 180M may obtain a vibration signal. The button 190 includes a power button, a volume button, and the like. The button 190 may be a mechanical button, or may be a touch button. The motor 191 may generate a vibration prompt. The indicator 192 may be an indicator light, and may be configured to indicate a charging status and a power change, or may be configured to indicate a message, a missed call, a notification, and the like.

The SIM card interface 195 is configured to connect to a SIM card. The SIM card may be inserted into the SIM card interface 195 or removed from the SIM card interface 195, to implement contact with or separation from the electronic device 100. The electronic device 100 may support one or N SIM card interfaces, where N is a positive integer greater than 1. The SIM card interface 195 may support a nano-SIM card, a micro-SIM card, a SIM card, and the like. A plurality of cards may be inserted into a same SIM card interface 195 at the same time.

Figure 6B:
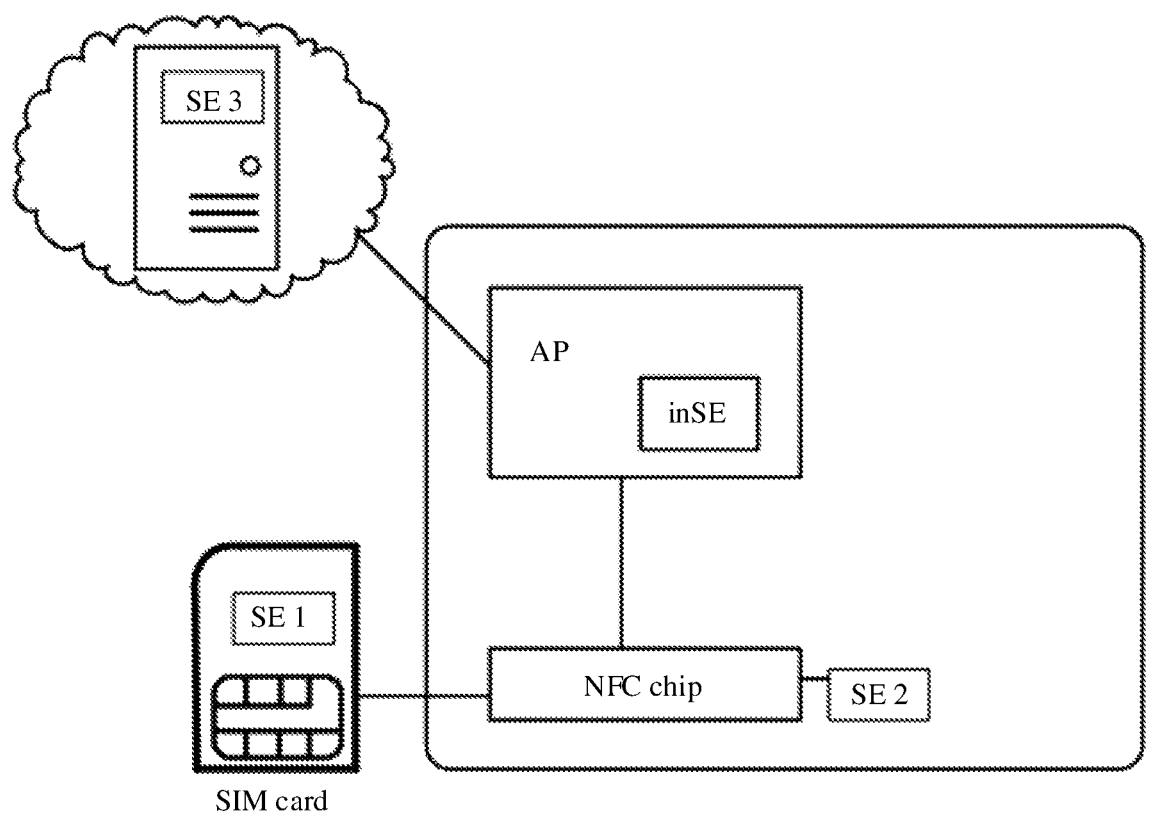
FIG. 6B is a schematic diagram of a location of a secure element according to an embodiment of this application.

In embodiments of this application, a secure element (secure element, SE) may be further configured for the electronic device. The SE may be configured to store some private data designed when the electronic device uses the NFC technology, for example, card information simulated by the electronic device, such as a UID and an account balance. As shown in FIG. 6B, the SE may include one or more of the following: an SE 1 in a form of a SIM card, an SE 2 packaged with an NFC chip, and an inSE in a form of an AP, for example, referred to as an SE 3.

A software system of the electronic device 100 may use a layered architecture, an event-driven architecture, a micro-kernel architecture, a micro service architecture, or a cloud architecture. In embodiments of the present invention, an Android system with a layered architecture is used as an example to describe a software structure of the electronic device 100.

Figure 6C:
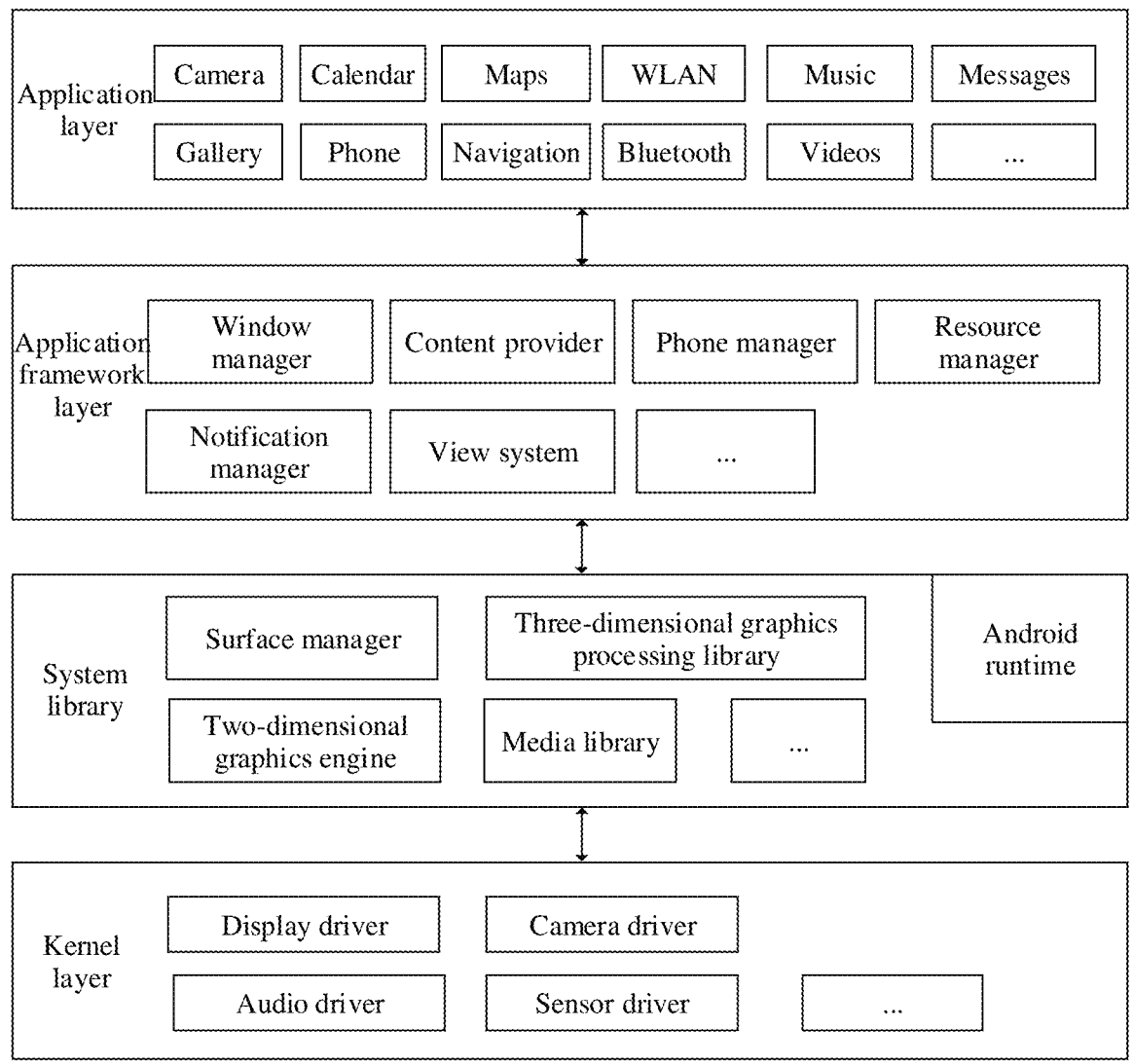
FIG. 6C is a block diagram of a software structure of an electronic device according to an embodiment of this application.

FIG. 6C is a block diagram of a software structure of the electronic device 100 according to an embodiment of the present invention.

In a layered architecture, software is divided into several layers, and each layer has a clear role and task. The layers communicate with each other through a software interface. In some embodiments, the Android system is divided into four layers from top to bottom: an application layer, an application framework layer, an Android runtime (Android runtime) and system library, and a kernel layer.

The application layer may include a series of application packages.

As shown in FIG. 6C, the application packages may include applications such as Camera, Gallery, Calendar, Phone, Maps, Navigation, WLAN, Bluetooth, Music, Videos, and Messages.

The application framework layer provides an application programming interface (application programming interface, API) and a programming framework for an application at the application layer. The application framework layer includes some predefined functions.

As shown in FIG. 6C, the application framework layer may include a window manager, a content provider, a view system, a phone manager, a resource manager, a notification manager, and the like.

The window manager is configured to manage a window program. The window manager may obtain a size of a display, determine whether there is a status bar, lock a screen, take a screenshot, and the like.

The content provider is configured to: store and obtain data, and enable the data to be accessed by an application. The view system includes visual controls such as a control for displaying a text and a control for displaying an image. The view system may be configured to construct an application. A display interface may include one or more views.

The phone manager is configured to provide a communication function of the electronic device 100, for example, management of a call status (including answering, declining, or the like).

The resource manager provides an application with various resources such as a localized character string, an icon, an image, a layout file, and a video file.

The notification manager enables an application to display notification information in a status bar, and may be configured to convey a notification-type message. The displayed notification information may automatically disappear after a short pause without user interaction.

The Android runtime includes a kernel library and a virtual machine. The Android runtime is responsible for scheduling and management of the Android system.

The kernel library includes two parts: a function that needs to be invoked in java language and a kernel library of Android.

The application layer and the application framework layer run in the virtual machine. The virtual machine executes Java files at the application layer and the application framework layer as binary files. The virtual machine is configured to implement functions such as object lifecycle management, stack management, thread management, security and exception management, and garbage collection.

The system library may include a plurality of function modules, for example, a surface manager (surface manager), a media library (Media Library), a three-dimensional graphics processing library (for example, OpenGL ES), and a 2D graphics engine (for example, SGL).

The surface manager is configured to manage a display subsystem and provide fusion of 2D and 3D layers for a plurality of applications.

The media library supports playback and recording in a plurality of commonly used audio and video formats, static image files, and the like. The media library may support a plurality of audio and video encoding formats, for example, MPEG-4, H.264, MP3, AAC, AMR, JPG, and PNG.

The three-dimensional graphics processing library is configured to implement three-dimensional graphics drawing, image rendering, composition, layer processing, and the like.

The 2D graphics engine is a drawing engine for 2D drawing.

The kernel layer is a layer between hardware and software. The kernel layer includes at least a display driver, a camera driver, an audio driver, and a sensor driver.

Figure 7:
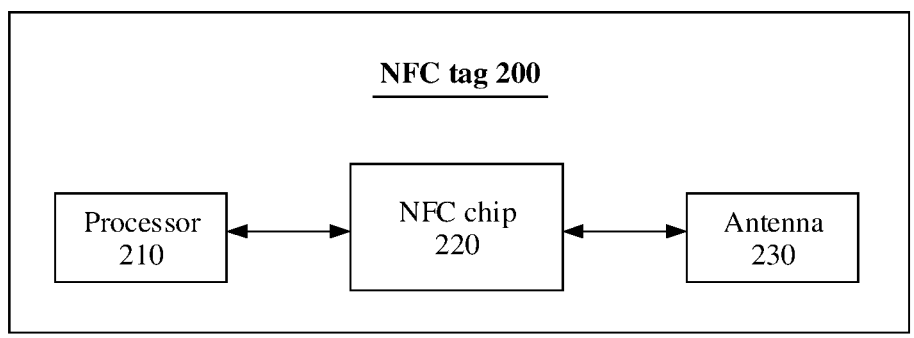
FIG. 7 is a schematic diagram of a structure of an NFC tag according to an embodiment of this application.

FIG. 7 is a schematic diagram of a structure of an example of the NFC tag 201 according to an embodiment of this application. The NFC tag 201 may be built in the first device 200, or may be attached to the first device 200. This is not limited in this embodiment of this application.

As shown in FIG. 7, the NFC tag 201 may include a processor 210, an NFC chip 220, and an antenna 230.

The processor 210 may include one or more processing units. For example, the processor 210 may include a modem processor, a digital signal processor, a baseband processor, and the like. Different processing units may be independent devices, or may be integrated into one or more processors. The processor 210 may generate an operation control signal based on instruction operation code and a time sequence signal, to complete control of instruction reading and instruction execution.

The processor 210 may include one or more interfaces. The interface may include an inter-integrated circuit (inter-integrated circuit, I2C) interface. The I2C interface is a two-way synchronization serial bus, and includes one serial data line (serial data line, SDA) and one serial clock line (serial clock line, SCL). The processor 210 may be coupled to the NFC chip 220 by using an I2C bus interface, to implement data transmission with the NFC chip 220.

The processor 210 is configured to: receive a signal transmitted by the NFC chip, parse the signal, and perform a corresponding operation in response to the signal. The processor 210 is further configured to generate a to-be-sent signal, and send the to-be-sent signal to the NFC chip 210.

A memory may be further disposed in the processor 210, and is configured to store instructions and data.

In this embodiment of this application, the processor 210 is configured to generate a to-be-sent signal, and send the to-be-sent signal to the NFC chip 220. The NFC chip is configured to: process a signal from the processor 210 by using a load modulation technology, convert the signal into a radio frequency signal through the antenna, and radiate the radio frequency signal.

A battery 240 is configured to supply electric energy to each module of the electronic device 200. The battery 240 may include but is not limited to a dry battery, a button battery, a rechargeable battery, and the like.

It may be understood that, the structures shown in this embodiment of this application do not constitute a specific limitation to the electronic device 200. In other embodiments, the electronic device 200 may include more or fewer components than those shown in the figure, or combine some components, or split some components, or have different component arrangements. The components shown in the figure may be implemented by hardware, software, or a combination of software and hardware.

The implementations of this application may be randomly combined to achieve different technical effects.

All or some of the foregoing embodiments may be implemented by using software, hardware, firmware, or any combination thereof. When software is used to implement embodiments, all or some of the embodiments may be implemented in a form of a computer program product. The computer program product includes one or more computer instructions. When the computer program instructions are loaded and executed on a computer, all or some of the procedures or functions in this application are generated. The computer may be a general-purpose computer, a dedicated computer, a computer network, or another programmable apparatus. The computer instructions may be stored in the computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line) or wireless (for example, infrared, radio, or microwave) manner. The computer-readable storage medium may be any usable medium accessible by the computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid state disk (Solid State Disk)), or the like.

Persons of ordinary skill in the art may understand that all or some of the procedures of the methods in the embodiments may be implemented by a computer program instructing related hardware. The program may be stored in a computer-readable storage medium. When the program is executed, the procedures in the method embodiments may be included. The foregoing storage medium includes any medium that can store program code, such as a ROM, a random access memory RAM, a magnetic disk, or an optical disc.

In conclusion, the foregoing descriptions are merely embodiments of the technical solutions of the present invention, but are not intended to limit the protection scope of the present invention. Any modification, equivalent replacement, or improvement made according to the disclosure of the present invention shall fall within the protection scope of the present invention.

What is claimed is:

1. A communication method comprising:
performing, by an electronic device supporting near field communication (NFC) and operating in an NFC reader/writer mode, an NFC communication process between the electronic device and an NFC tag using a first radio frequency parameter;
performing, by the electronic device in the NFC reader/writer mode, the NFC communication process again using a second radio frequency parameter when a preset condition is met, wherein the second radio frequency parameter is different from the first radio frequency parameter; and
when the electronic device successfully performs the NFC communication process using the second radio frequency parameter, storing, by the electronic device, a unique identifier (UID) of the NFC tag and the second radio frequency parameter in association, or writing, by the electronic device, the second radio frequency parameter to the NFC tag; and wherein the first radio frequency parameter and the second radio frequency parameter each comprise one or more of following: transmit power of sending a radio frequency signal by the electronic device, sensitivity of receiving a radio frequency signal by the electronic device, a modulation mode used during load modulation, a waveform of a carrier, an amplitude of the carrier, a phase of the carrier, or a frequency of the carrier.

2. The method according to claim 1, wherein performing, by the electronic device, the NFC communication process again using the second radio frequency parameter when the preset condition is met comprises:

when the electronic device, using the first radio frequency parameter, does not receive a complete UID of the NFC tag within a time period T1 after the NFC tag is detected, receiving, by the electronic device, the UID using the second radio frequency parameter, and reading, by the electronic device, data from the NFC tag.

3. The method according to claim 2, wherein a difference between the second radio frequency parameter and the first radio frequency parameter exceeds a preset range.

4. The method according to claim 1, wherein performing, by the electronic device, the NFC communication process again using the second radio frequency parameter when the preset condition is met comprises:

when a quantity of times of generating a radio frequency lost message by the electronic device is greater than a first value, or when the electronic device does not receive a reply from the NFC tag in response to a first message within a time period T2 after the electronic device sends the first message to the NFC tag, or when data read by the electronic device from the NFC tag is incomplete or inaccurate, generating, by the electronic device, a radio frequency field again using the second radio frequency parameter, establishing, by the electronic device, an NFC radio frequency connection with the NFC tag, and reading, by the electronic device, data from the NFC tag.

5. The method according to claim 4, wherein a difference between the second radio frequency parameter and the first radio frequency parameter is within a preset range.

6. The method according to claim 1, wherein after performing, by the electronic device, the NFC communication process again using the second radio frequency parameter, the method further comprises:

when the electronic device successfully performs the NFC communication process using the second radio frequency parameter, performing, by the electronic device, a corresponding operation based on data read from the NFC tag, wherein the corresponding operation comprises any one of following: establishing a connection to a first device and transmitting audio and video data to the first device, accessing a website, downloading a file, or storing the data read from the NFC tag.

7. The method according to claim 1, wherein the method further comprises:

when a quantity of times of failing to perform the NFC communication process by the electronic device exceeds a second value, searching, by the electronic device, for a radio frequency parameter that is stored in association with the UID of the NFC tag, and performing, by the electronic device, the NFC communication process again using the radio frequency parameter that is stored in association with the UID of the NFC tag.

8. The method according to claim 1, wherein before performing, by the electronic device, the NFC communication process again using the second radio frequency parameter when the preset condition is met, the method further comprises: displaying, by the electronic device, a first user interface, wherein the first user interface comprises a first control; and detecting, by the electronic device, a user operation performed on the first control; and performing, by the electronic device, the NFC communication process again using the second radio frequency parameter comprises: in response to the user operation performed on the first control, performing, by the electronic device, the NFC communication process again using the second radio frequency parameter.

9. The method according to claim 1, wherein performing, by the electronic device, the NFC communication process again using the second radio frequency parameter comprises:

when detecting that the electronic device approaches the NFC tag, performing, by the electronic device, the NFC communication process again using the second radio frequency parameter.

10. An electronic device, wherein the electronic device supports near field communication (NFC), and the electronic device comprises a non-transitory memory, an NFC chip, and one or more processors; and the memory is coupled to the one or more processors, the memory is configured to store computer program code, the computer program code comprises computer instructions, and the one or more processors invoke the computer instructions to cause the electronic device to perform:

performing, when operating in an NFC reader/writer mode, an NFC communication process between the electronic device and an NFC tag using a first radio frequency parameter;

performing the NFC communication process again in the NFC reader/writer mode using a second radio frequency parameter when a preset condition is met, wherein the second radio frequency parameter is different from the first radio frequency parameter; and when the electronic device successfully performs the NFC communication process using the second radio frequency parameter, storing, by the electronic device, a unique identifier (UID) of the NFC tag and the second radio frequency parameter in association, or writing, by the electronic device, the second radio frequency parameter to the NFC tag; and wherein the first radio frequency parameter and the second radio frequency parameter each comprise one or more of following: transmit power of sending a radio frequency signal by the NFC chip, sensitivity of receiving a radio frequency signal by the NFC chip, a modulation mode used during load modulation, a waveform of a carrier, an amplitude of the carrier, a phase of the carrier, or a frequency of the carrier.

11. The electronic device according to claim 10, wherein the one or more processors invoke the computer instructions to cause the electronic device further to perform:

when the electronic device, using the first radio frequency parameter, does not receive a complete UID of the NFC tag within a time period T1 after the NFC tag is detected, receiving the UID again using the second radio frequency parameter, and reading data from the NFC tag.

12. The electronic device according to claim 11, wherein a difference between the second radio frequency parameter and the first radio frequency parameter exceeds a preset range.

13. The electronic device according to claim 10, wherein the one or more processors invoke the computer instructions to cause the electronic device further to perform:
when a quantity of times of generating a radio frequency lost message by the electronic device is greater than a first value, or when the electronic device does not receive a reply from the NFC tag in response to a first message within a time period T2 after the electronic device sends the first message to the NFC tag, or when data read by the electronic device from the NFC tag is incomplete or inaccurate, generating a radio frequency field again using the second radio frequency parameter, establishing an NFC radio frequency connection with the NFC tag, and reading data from the NFC tag.

14. The electronic device according to claim 13, wherein a difference between the second radio frequency parameter and the first radio frequency parameter is within a preset range.

15. The electronic device according to claim 10, wherein the one or more processors invoke the computer instructions to cause the electronic device further to perform:
when successfully performing the NFC communication process using the second radio frequency parameter, performing a corresponding operation based on data read from the NFC tag, wherein the corresponding operation comprises any one of following: establishing a connection to a first device and transmitting audio and video data to the first device, accessing a website, downloading a file, or storing the data.

16. The electronic device according to claim 10, wherein the one or more processors invoke the computer instructions to cause the electronic device further to perform:
when a quantity of times of failing to perform the NFC communication process exceeds a second value, searching for a radio frequency parameter that is stored in association with the UID of the NFC tag, and performing the NFC communication process again using the radio frequency parameter that is stored in association with the UID of the NFC tag.

17. The electronic device according to claim 10, wherein the one or more processors invoke the computer instructions to cause the electronic device further to perform:
before performing the NFC communication process again using the second radio frequency parameter when the preset condition is met, displaying a first user interface, wherein the first user interface comprises a first control; and detecting a user operation performed on the first control; and
in response to the user operation performed on the first control, performing the NFC communication process again using the second radio frequency parameter.

18. The electronic device according to claim 10, wherein the one or more processors invoke the computer instructions to cause the electronic device further to perform:
when detecting that the electronic device approaches the NFC tag, performing the NFC communication process again using the second radio frequency parameter.

* * * * *